US012664598B1

(12) United States Patent
Chua et al.

(10) Patent No.: US 12,664,598 B1
(45) Date of Patent: Jun. 23, 2026

(54) INTELLECTUAL PROPERTY MODEL PARAMETER TRAINING AND UTILIZATION

(71) Applicant: Moat Metrics, Inc., Spokane, WA (US)

(72) Inventors: Poh C. Chua, Fairfax, VA (US); Lewis C. Lee, Seattle, WA (US); Daniel Crouse, Seattle, WA (US); Rohitasva Dutta, New York, NY (US)

(73) Assignee: Moat Metrics, Inc., Spokane, WA (US)

( * ) Notice: Subject to any disclaimer, the term of this patent is extended or adjusted under 35 U.S.C. 154(b) by 324 days.

(21) Appl. No.: 17/570,901

(22) Filed: Jan. 7, 2022

(51) Int. Cl.
| | |
|---|---|
| *G06Q 50/18* | (2012.01) |
| *G06Q 20/38* | (2012.01) |
| *G06Q 20/40* | (2012.01) |

(52) U.S. Cl.
CPC ......... *G06Q 50/184* (2013.01); *G06Q 20/389* (2013.01); *G06Q 20/401* (2013.01)

(58) Field of Classification Search
None
See application file for complete search history.

(56) References Cited

U.S. PATENT DOCUMENTS

| | | | | | |
|---|---|---|---|---|---|
| 5,991,751 | A | * | 11/1999 | Rivette | ................. G06F 16/382 |
| | | | | | 707/E17.093 |
| 6,175,824 | B1 | * | 1/2001 | Breitzman | ............. G06Q 40/04 |
| | | | | | 705/37 |
| 2003/0036945 | A1 | | 2/2003 | Del Vecchio et al. | |

| | | | | | |
|---|---|---|---|---|---|
| 2006/0200395 | A1 | * | 9/2006 | Masuyama | ............ G06Q 40/00 |
| | | | | | 705/35 |
| 2012/0278244 | A1 | * | 11/2012 | Lee | ....................... G06Q 50/184 |
| | | | | | 705/310 |
| 2014/0258143 | A1 | * | 9/2014 | Laroche | ............... G06Q 50/184 |
| | | | | | 705/310 |
| 2015/0134596 | A1 | * | 5/2015 | Lu | ........................ G06Q 50/184 |
| | | | | | 707/603 |
| 2016/0350886 | A1 | * | 12/2016 | Jessen | .................. G06Q 50/184 |
| 2022/0188950 | A1 | * | 6/2022 | Gschwendtner | ....... G06N 20/00 |
| 2023/0036945 | A1 | * | 2/2023 | Bustin | ................... B60W 50/14 |
| 2023/0087206 | A1 | * | 3/2023 | Lee | .................... G06Q 30/0201 |
| | | | | | 705/7.29 |
| 2023/0325859 | A1 | * | 10/2023 | Fleming | ............... G06Q 10/067 |
| | | | | | 705/7.33 |

FOREIGN PATENT DOCUMENTS

| | | | |
|---|---|---|---|
| WO | 0073945 | A1 | 12/2000 |

OTHER PUBLICATIONS

Treleaven, et al., Computational Finance, published in IEEE Computer (vol. 43 , Issue: 12 , Dec. 2010 ), entire document pertinent (Year: 2010).*

(Continued)

*Primary Examiner* — Paul S Schwarzenberg
(74) *Attorney, Agent, or Firm* — Lee & Hayes, P.C.

(57) ABSTRACT

Systems and methods for intellectual property model parameter training and utilization are disclosed. For example, intellectual property assets are analyzed quickly and based on parsed data from multiple disparate datasets to generate quality scores. The quality scores are then utilized for multiple purposes, including determining financing amount indications, insurability indications, feedback loops, benchmarking, entity rating, and other purposes.

20 Claims, 19 Drawing Sheets

(56) References Cited

OTHER PUBLICATIONS

Hua, et al., "A Brief Review of Machine Learning and its Application", 2009, Information Engineering Institute Capital Normal University, entire document pertinent (Year: 2009) (Year: 2009).*

A. Tseng, et al. "Text mining techniques for patent analysis." Information processing & management 43.5 (2007): 1216-1247.

Office Action for U.S. Appl. No. 17/570,951, mailed on Jan. 19, 2024, Chua, "Intellectual Property Model Parameter Training and Utilization", 17 Pages.

Office Action for U.S. Appl. No. 17/571,011, mailed on Nov. 17, 2023, Chua, "Intellectual Property Model Parameter Training and Utilization", 34 Pages.

Office Action for U.S. Appl. No. 15/571,011, mailed on Apr. 26, 2024, Chua, "Intellectual Property Model Parameter Training and Utilization", 20 pages.

Office Action for U.S. Appl. No. 17/570,951, mailed on Jun. 6, 2024, Chua, "Intellectual Property Model Parameter Training and Utilization", 22 pages.

* cited by examiner

| | Factor 202 | Description 204 | Score 206 | Weighting 208 | Weighted Score 210 |
|---|---|---|---|---|---|
| Coverage | Issued IP Assets | Countries | 0.5 | 0.5 | 0.25 |
| | Issued IP Assets in Primary Jurisdiction | Countries | 0.5 | 1 | 0.5 |
| | Market Alignment | Market(s) | 0.5 | 1.5 | 0.75 |
| | IP Breadth | Broad/Narrow | 0.5 | 1 | 0.5 |
| | Factor X | Description X | Score X | X Weight | X Weighted Score |
| | Subtotal | | | | Subtotal X |
| Opportunity | Pending Applications | Countries | 0.5 | 0.5 | 0.25 |
| | Pending Applications in Primary Jurisdiction | Countries | 0.5 | 0.5 | 0.25 |
| | Filing Velocity(s) | Market(s) | 0.5 | 1.0 | 0.5 |
| | Product Markets | Market(s) | 0.5 | 1.0 | 0.5 |
| | Factor Y | Description Y | Score Y | Y Weight | Y Weighted Score |
| | Subtotal | | | | Subtotal Y |
| Exposure | Validity Probability | Quadrant ID | 0.5 | 1.0 | 0.5 |
| | Assignees | Assignee IDs | 0.5 | 0.5 | 0.25 |
| | Total Cases | Plaintiff IDs & Defendant IDs | 0.5 | 0.5 | 0.25 |
| | Similar Entity Cases | Entity Score(s) | 0.5 | 0.2 | 0.1 |
| | Factor Z | Description Z | Score Z | Z Weight | Z Weighted Score |
| | Subtotal | | | | Subtotal Z |
| Total Quality Score | | | | | Quality Score |

FIG. 2

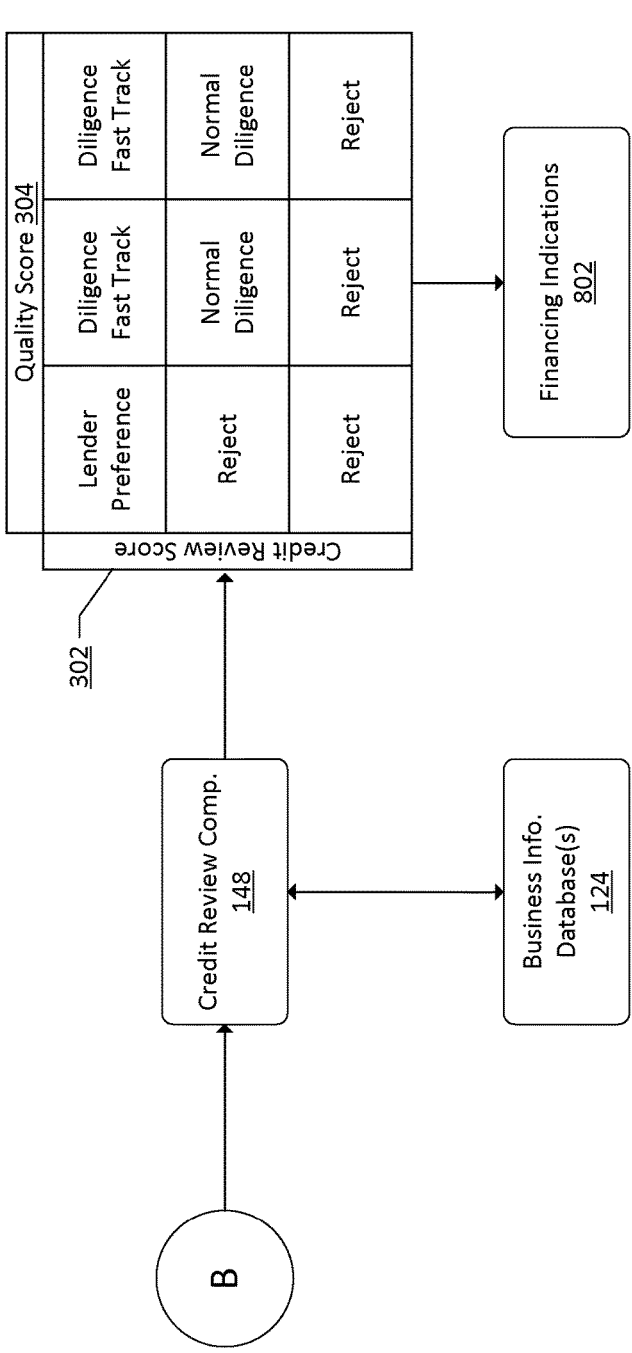
FIG. 8

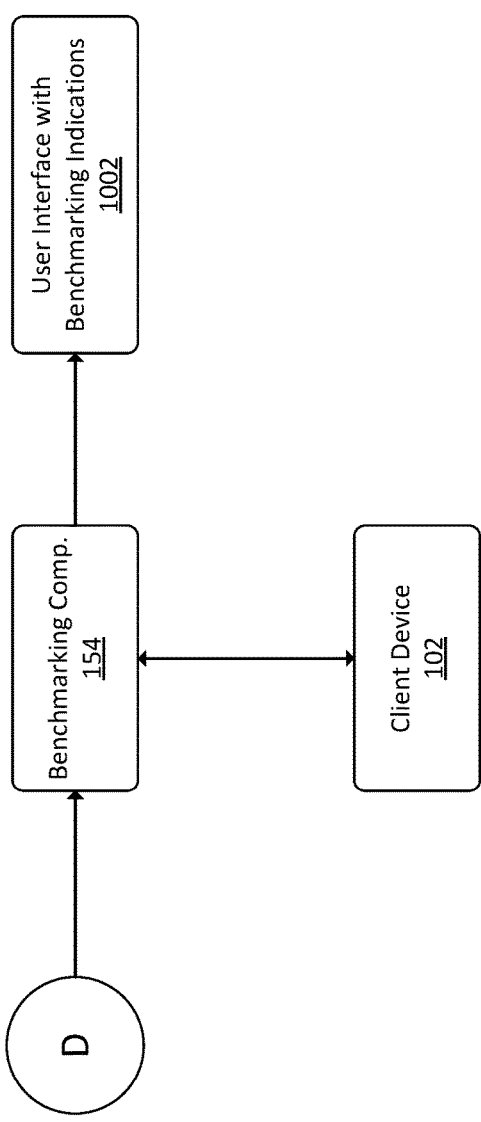
FIG. 10

1200

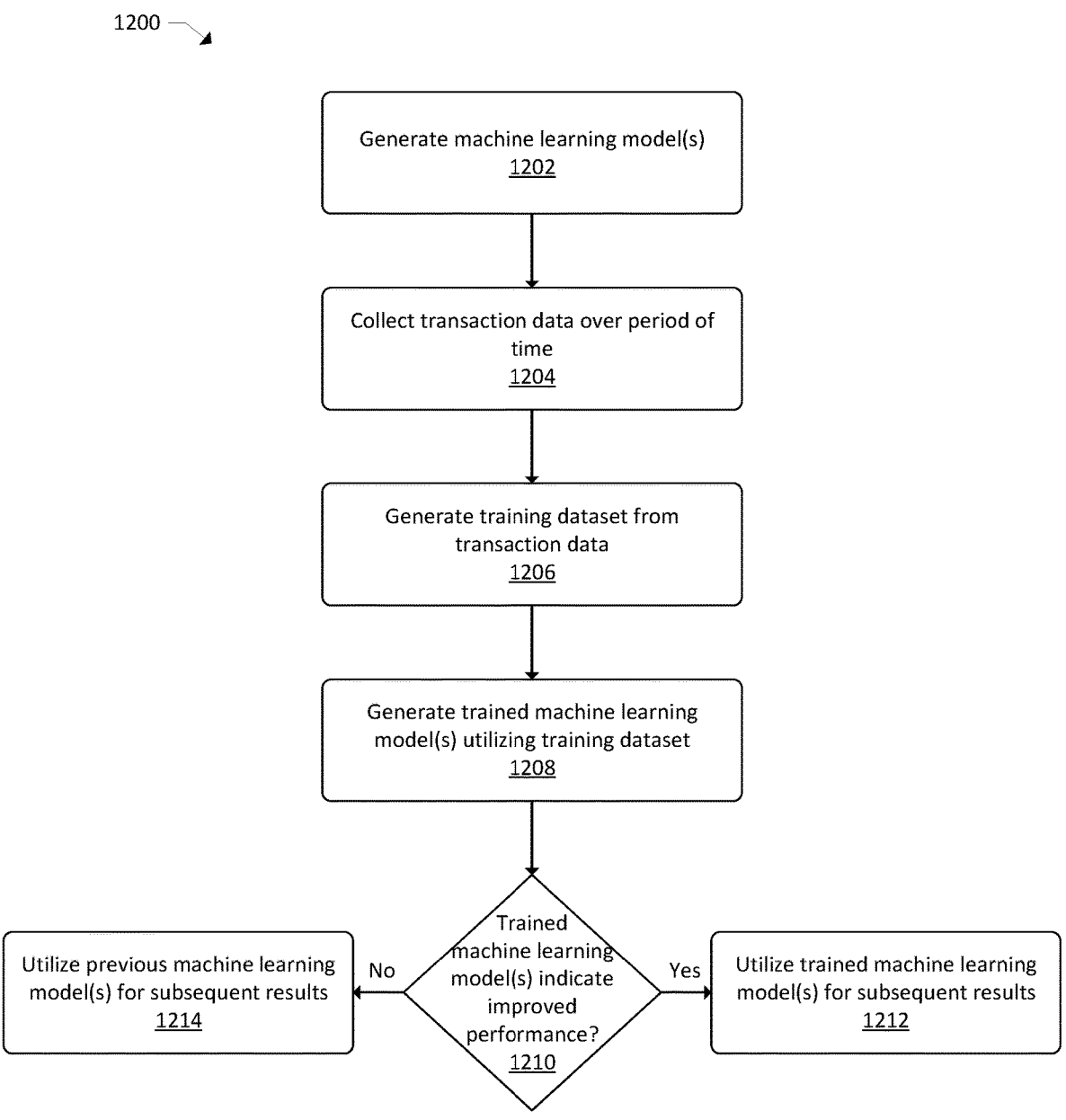

Generate machine learning model(s)
1202

Collect transaction data over period of time
1204

Generate training dataset from transaction data
1206

Generate trained machine learning model(s) utilizing training dataset
1208

Trained machine learning model(s) indicate improved performance?
1210

No

Yes

Utilize previous machine learning model(s) for subsequent results
1214

Utilize trained machine learning model(s) for subsequent results
1212

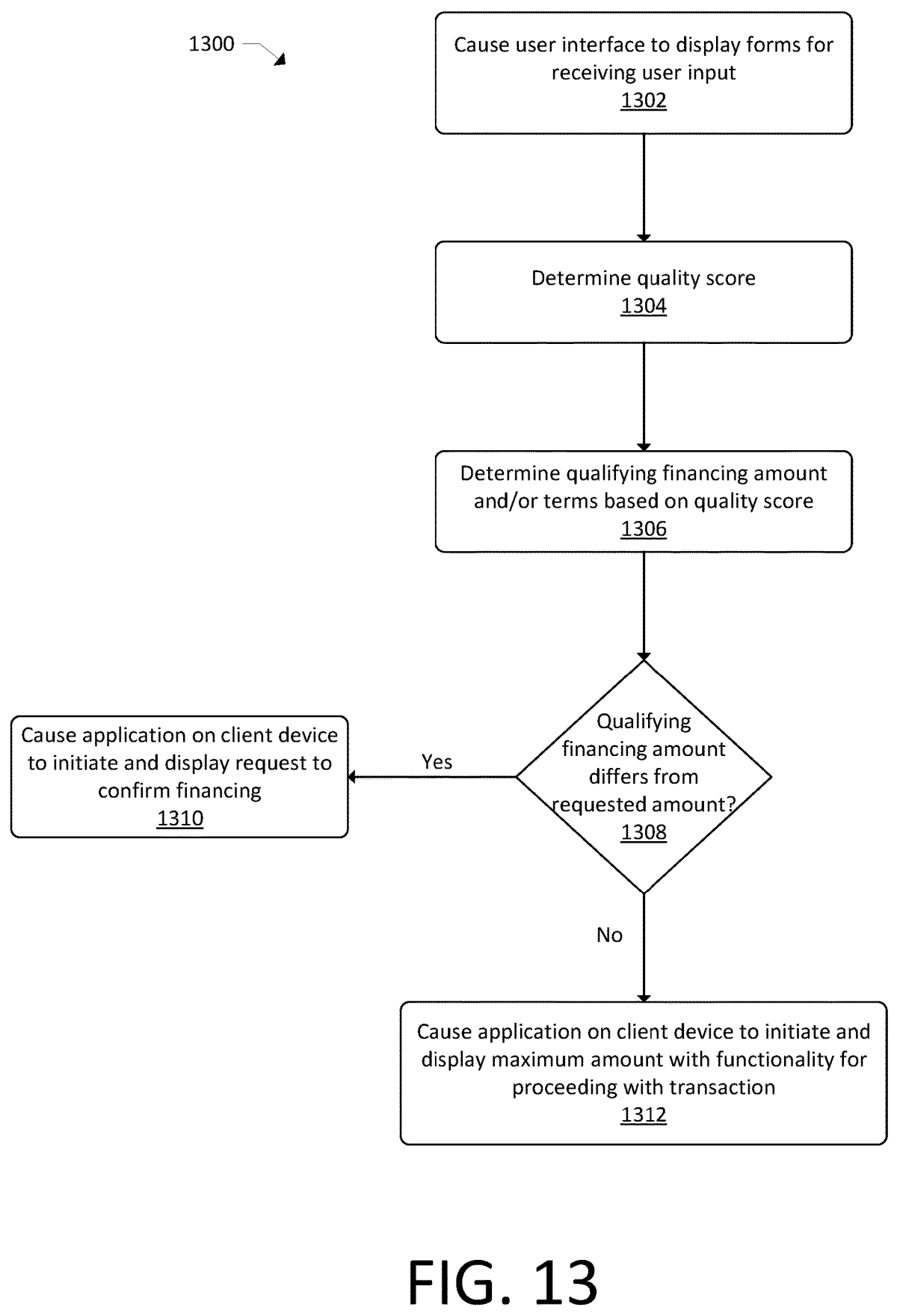

Cause user interface to display forms for
receiving user input
1302

Determine quality score
1304

Determine qualifying financing amount
and/or terms based on quality score
1306

Qualifying
financing amount
differs from
requested amount?
1308

Yes

Cause application on client device
to initiate and display request to
confirm financing
1310

No

Cause application on client device to initiate and
display maximum amount with functionality for
proceeding with transaction
1312

FIG. 13

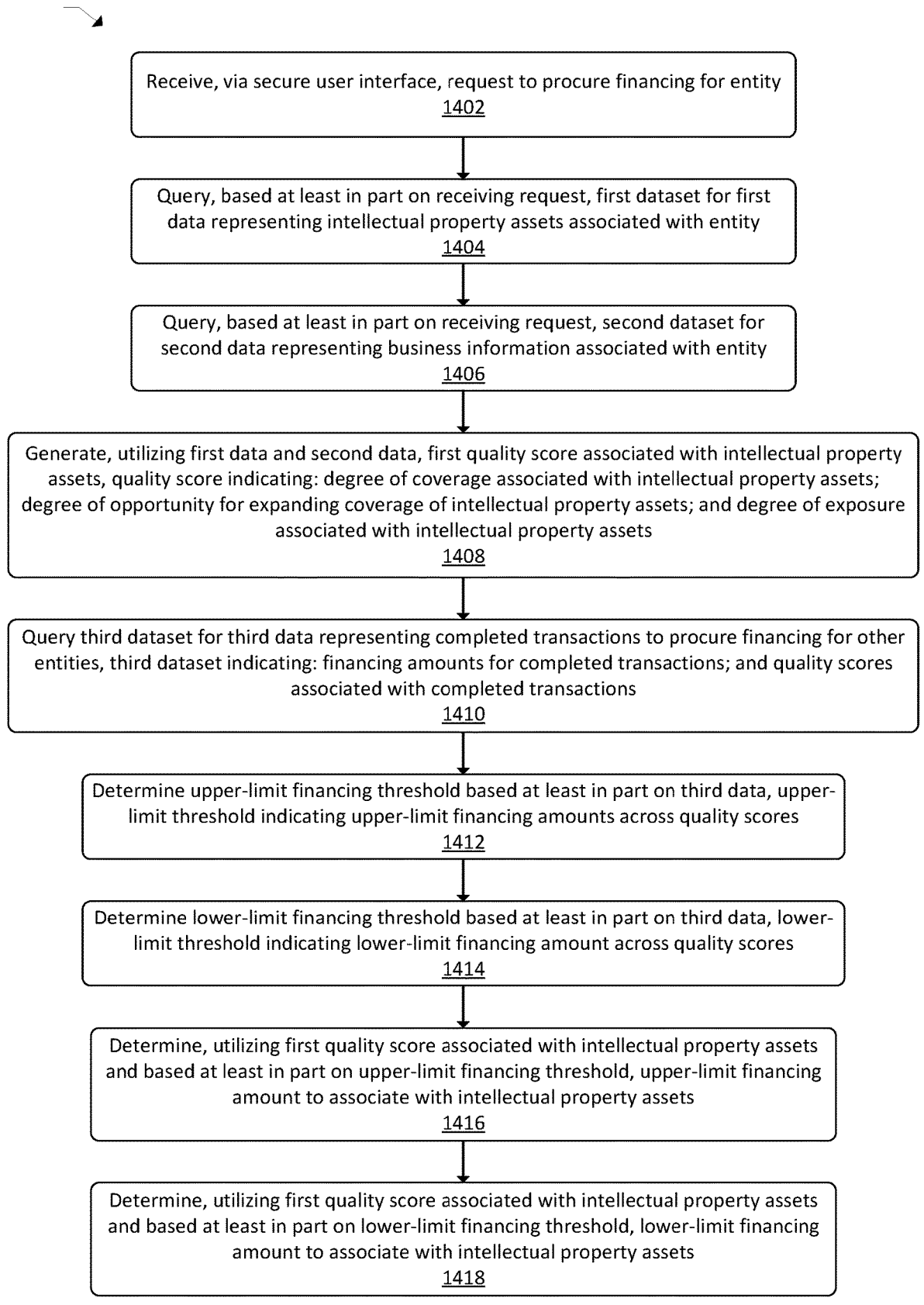

Receive, via secure user interface, request to procure financing for entity
1402

Query, based at least in part on receiving request, first dataset for first data representing intellectual property assets associated with entity
1404

Query, based at least in part on receiving request, second dataset for second data representing business information associated with entity
1406

Generate, utilizing first data and second data, first quality score associated with intellectual property assets, quality score indicating: degree of coverage associated with intellectual property assets; degree of opportunity for expanding coverage of intellectual property assets; and degree of exposure associated with intellectual property assets
1408

Query third dataset for third data representing completed transactions to procure financing for other entities, third dataset indicating: financing amounts for completed transactions; and quality scores associated with completed transactions
1410

Determine upper-limit financing threshold based at least in part on third data, upper-limit threshold indicating upper-limit financing amounts across quality scores
1412

Determine lower-limit financing threshold based at least in part on third data, lower-limit threshold indicating lower-limit financing amount across quality scores
1414

Determine, utilizing first quality score associated with intellectual property assets and based at least in part on upper-limit financing threshold, upper-limit financing amount to associate with intellectual property assets
1416

Determine, utilizing first quality score associated with intellectual property assets and based at least in part on lower-limit financing threshold, lower-limit financing amount to associate with intellectual property assets
1418

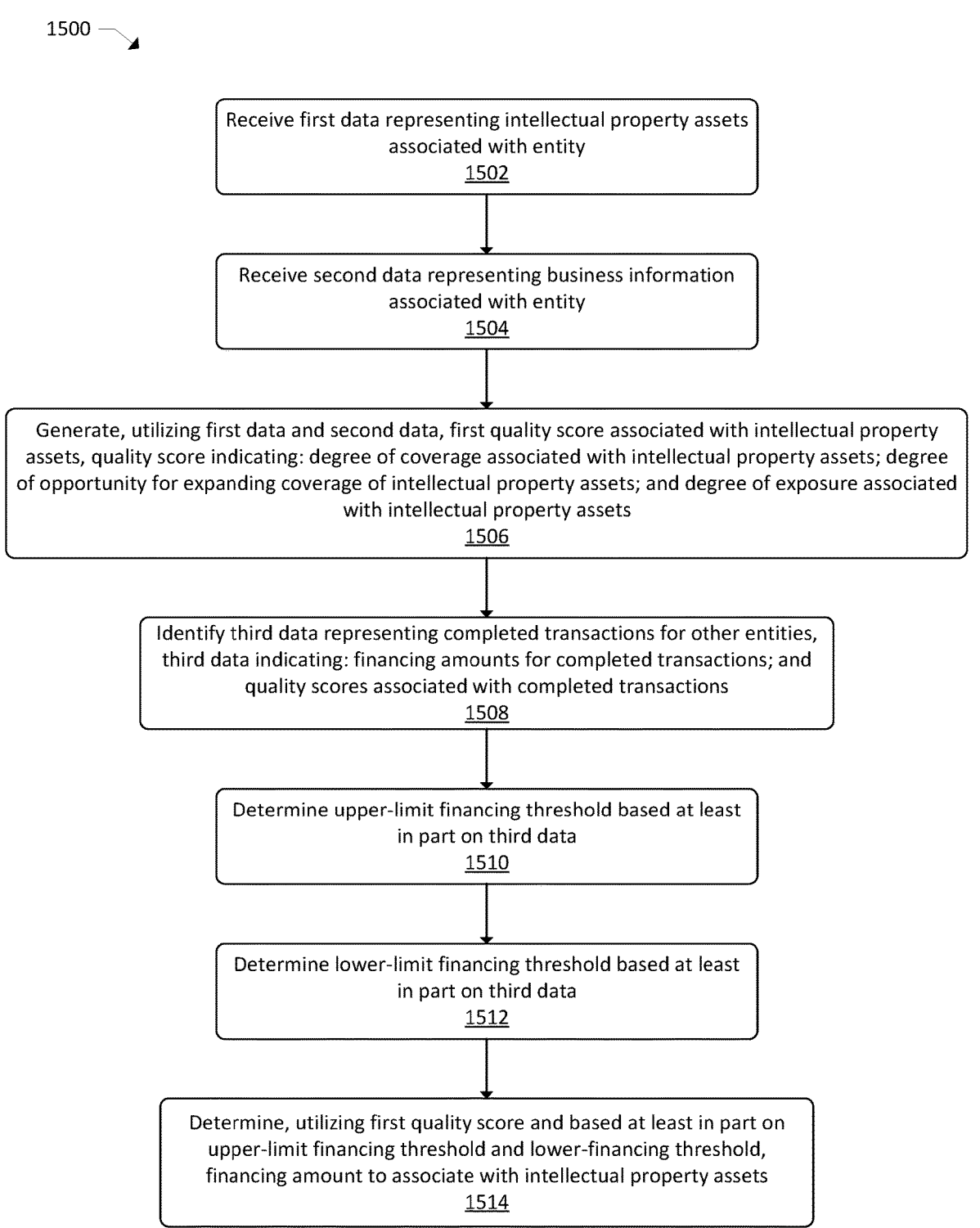

Receive first data representing intellectual property assets
associated with entity
1502

Receive second data representing business information
associated with entity
1504

Generate, utilizing first data and second data, first quality score associated with intellectual property
assets, quality score indicating: degree of coverage associated with intellectual property assets; degree
of opportunity for expanding coverage of intellectual property assets; and degree of exposure associated
with intellectual property assets
1506

Identify third data representing completed transactions for other entities,
third data indicating: financing amounts for completed transactions; and
quality scores associated with completed transactions
1508

Determine upper-limit financing threshold based at least
in part on third data
1510

Determine lower-limit financing threshold based at least
in part on third data
1512

Determine, utilizing first quality score and based at least in part on
upper-limit financing threshold and lower-financing threshold,
financing amount to associate with intellectual property assets
1514

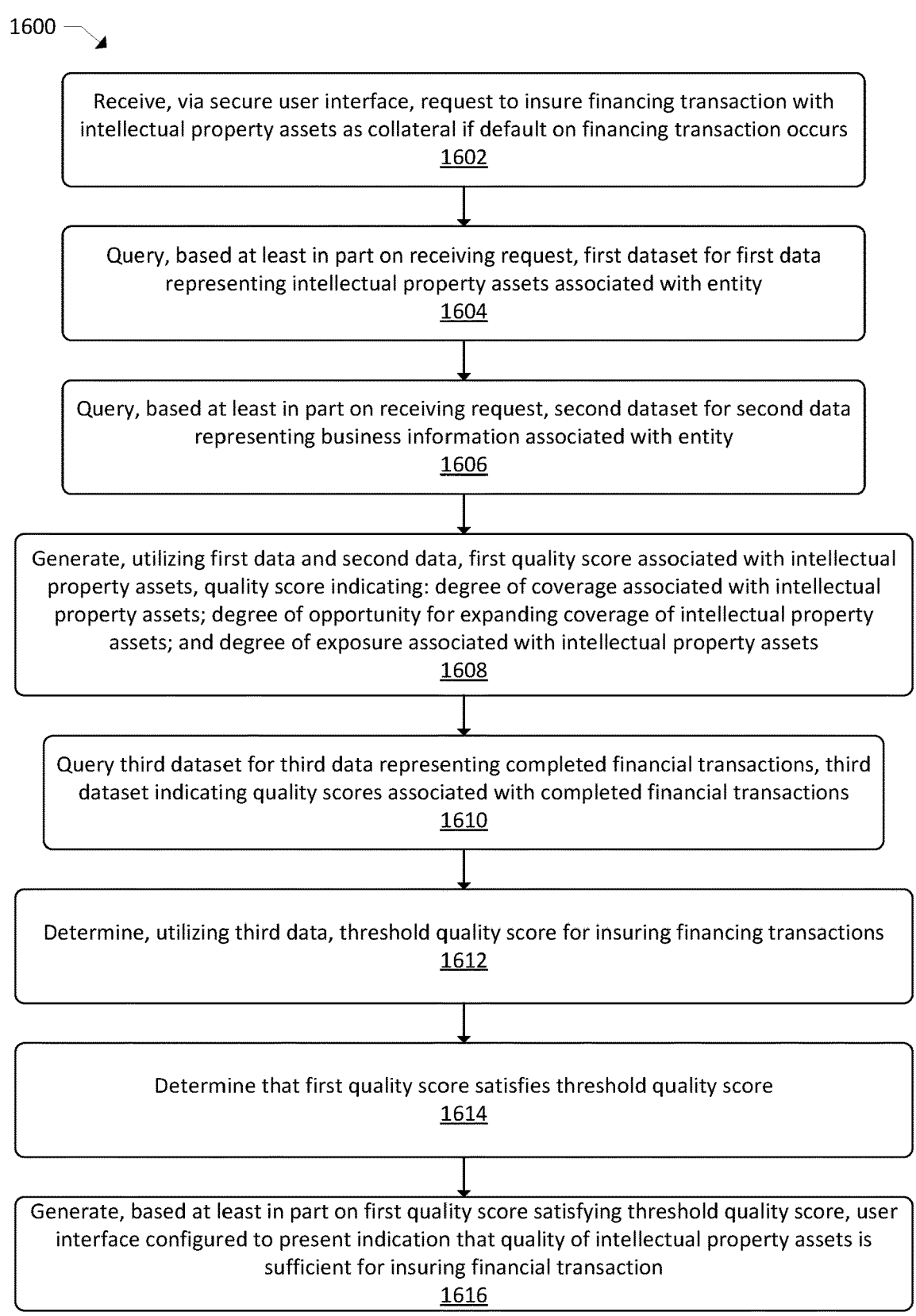

Receive, via secure user interface, request to insure financing transaction with intellectual property assets as collateral if default on financing transaction occurs
1602

Query, based at least in part on receiving request, first dataset for first data representing intellectual property assets associated with entity
1604

Query, based at least in part on receiving request, second dataset for second data representing business information associated with entity
1606

Generate, utilizing first data and second data, first quality score associated with intellectual property assets, quality score indicating: degree of coverage associated with intellectual property assets; degree of opportunity for expanding coverage of intellectual property assets; and degree of exposure associated with intellectual property assets
1608

Query third dataset for third data representing completed financial transactions, third dataset indicating quality scores associated with completed financial transactions
1610

Determine, utilizing third data, threshold quality score for insuring financing transactions
1612

Determine that first quality score satisfies threshold quality score
1614

Generate, based at least in part on first quality score satisfying threshold quality score, user interface configured to present indication that quality of intellectual property assets is sufficient for insuring financial transaction
1616

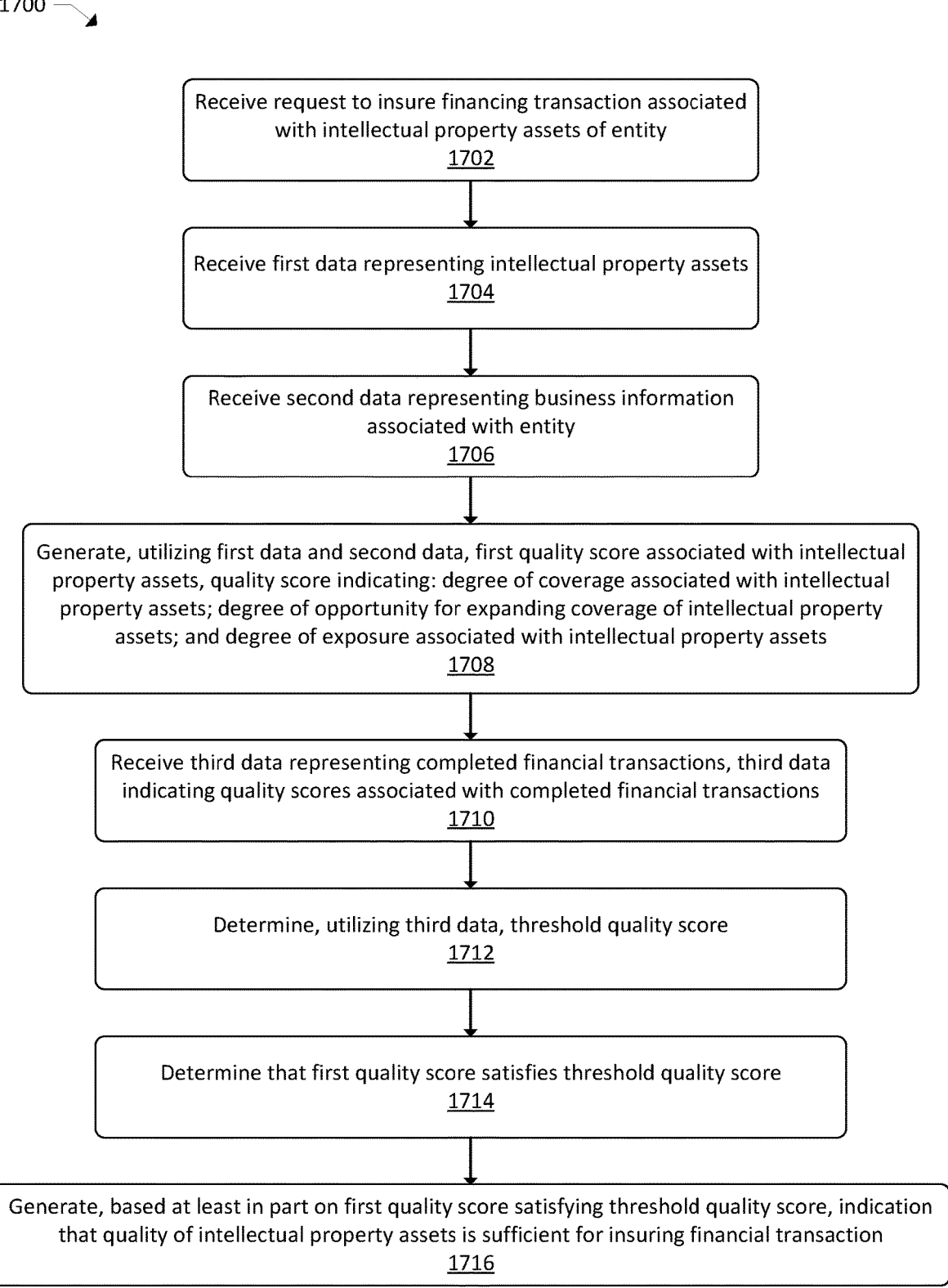

Receive request to insure financing transaction associated with intellectual property assets of entity
1702

Receive first data representing intellectual property assets
1704

Receive second data representing business information associated with entity
1706

Generate, utilizing first data and second data, first quality score associated with intellectual property assets, quality score indicating: degree of coverage associated with intellectual property assets; degree of opportunity for expanding coverage of intellectual property assets; and degree of exposure associated with intellectual property assets
1708

Receive third data representing completed financial transactions, third data indicating quality scores associated with completed financial transactions
1710

Determine, utilizing third data, threshold quality score
1712

Determine that first quality score satisfies threshold quality score
1714

Generate, based at least in part on first quality score satisfying threshold quality score, indication that quality of intellectual property assets is sufficient for insuring financial transaction
1716

Figure 18:
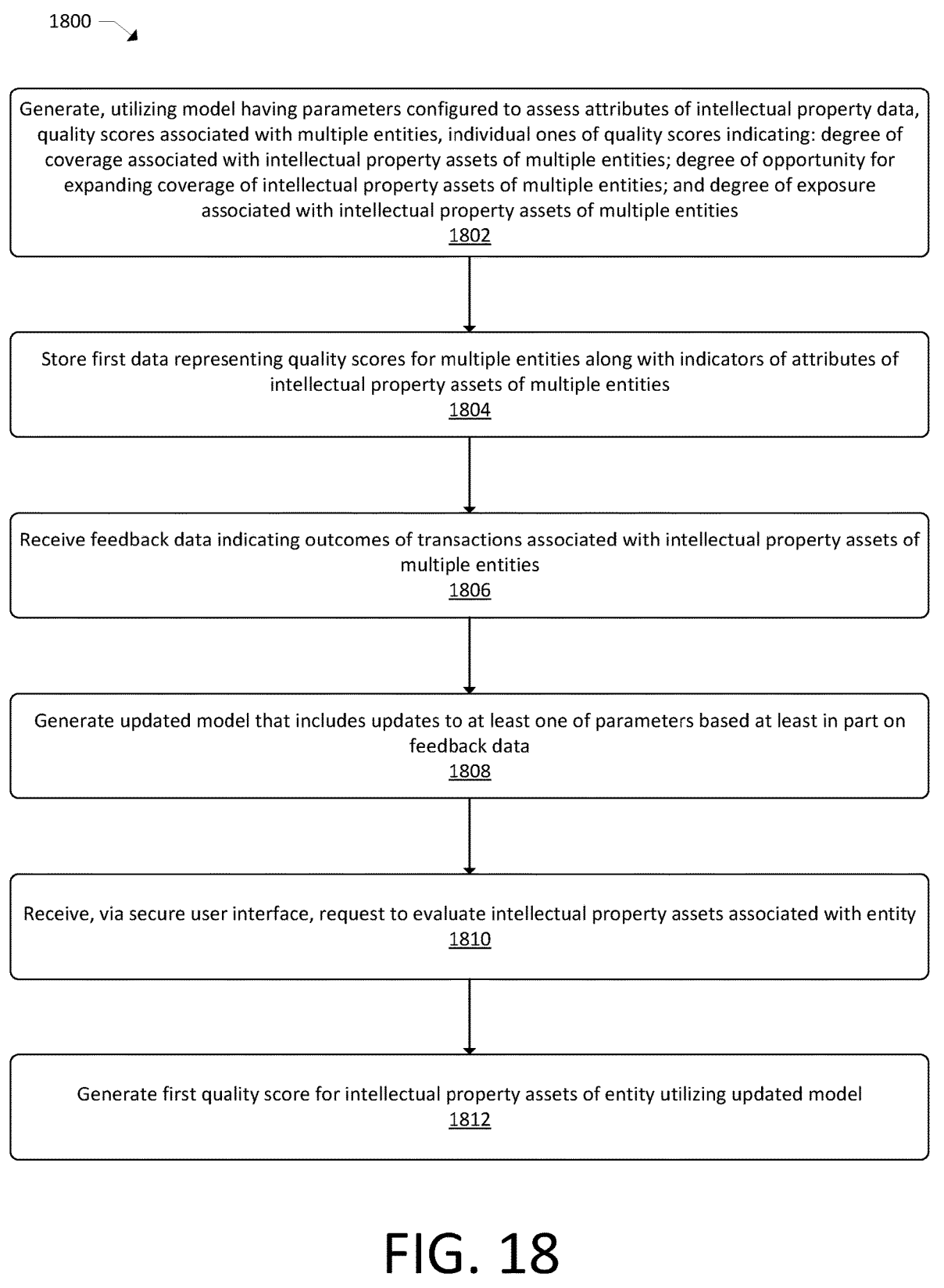

Generate, utilizing model having parameters configured to assess attributes of intellectual property data, quality scores associated with multiple entities, individual ones of quality scores indicating: degree of coverage associated with intellectual property assets of multiple entities; degree of opportunity for expanding coverage of intellectual property assets of multiple entities; and degree of exposure associated with intellectual property assets of multiple entities
1802

Store first data representing quality scores for multiple entities along with indicators of attributes of intellectual property assets of multiple entities
1804

Receive feedback data indicating outcomes of transactions associated with intellectual property assets of multiple entities
1806

Generate updated model that includes updates to at least one of parameters based at least in part on feedback data
1808

Receive, via secure user interface, request to evaluate intellectual property assets associated with entity
1810

Generate first quality score for intellectual property assets of entity utilizing updated model
1812

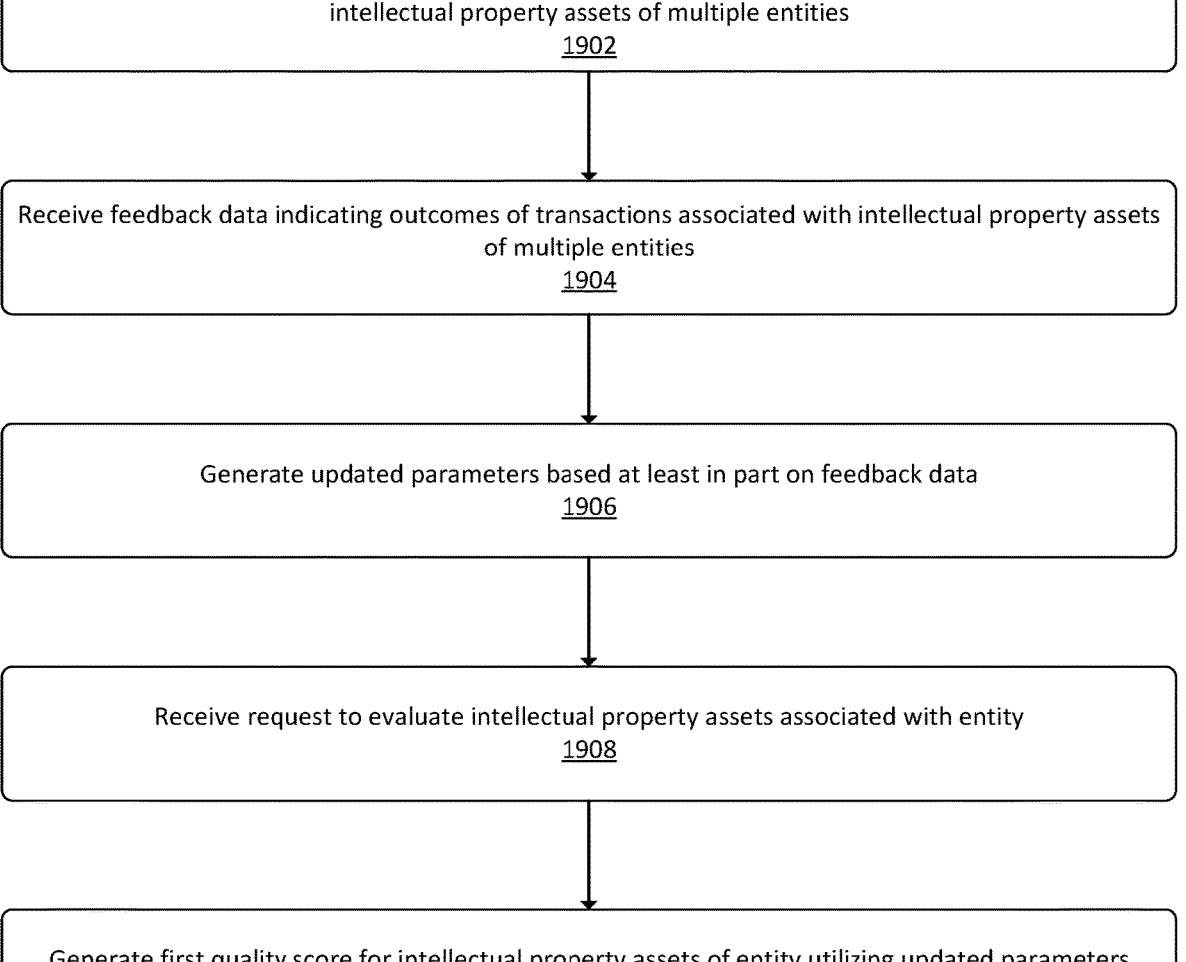

Generate, utilizing parameters configured to assess attributes of intellectual property data, quality scores associated with multiple entities, individual ones of quality scores indicating: degree of coverage associated with intellectual property assets of multiple entities; degree of opportunity for expanding coverage of intellectual property assets of multiple entities; and degree of exposure associated with intellectual property assets of multiple entities
1902

Receive feedback data indicating outcomes of transactions associated with intellectual property assets of multiple entities
1904

Generate updated parameters based at least in part on feedback data
1906

Receive request to evaluate intellectual property assets associated with entity
1908

Generate first quality score for intellectual property assets of entity utilizing updated parameters
1910

FIG. 19

INTELLECTUAL PROPERTY MODEL PARAMETER TRAINING AND UTILIZATION

BACKGROUND

Intellectual property is valuable but can be difficult to value. Additionally, intellectual property assets vary in quality but can be difficult to determine the quality of. Described herein are improvements in technology and solutions to technical problems that can be used to, among other things, assist in determining attributes associated with intellectual property assets.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a conceptual diagram of details associated with generation of intellectual property quality scores.

FIG. 8 illustrates a conceptual diagram of example components that utilize a quality score in comparison with credit review scores.

FIG. 10 illustrates a conceptual diagram of example components that utilize a quality score to generate benchmarking indications.

FIG. 12 illustrates a flow diagram of an example process for training one or more machine learning models in association with intellectual property assessments.

FIG. 13 illustrates a flow diagram of an example process for causing applications residing on devices to automatically display content relevant to intellectual property assessments.

FIG. 14 illustrates a flow diagram of an example process for determining reasonableness of financing amounts associated with intellectual property model parameter training.

FIG. 15 illustrates a flow diagram of another example process for determining reasonableness of financing amounts associated with intellectual property model parameter training.

FIG. 16 illustrates a flow diagram of an example process for determining insurability of a financing transaction associated with intellectual property assets utilizing model parameter training.

FIG. 17 illustrates a flow diagram of another example process for determining insurability of a financing transaction associated with intellectual property assets utilizing model parameter training.

FIG. 18 illustrates a flow diagram of an example process for generating intellectual property quality scores utilizing a feedback loop.

FIG. 19 illustrates a flow diagram of another example process for generating intellectual property quality scores utilizing a feedback loop.

DETAILED DESCRIPTION

Figure 1:
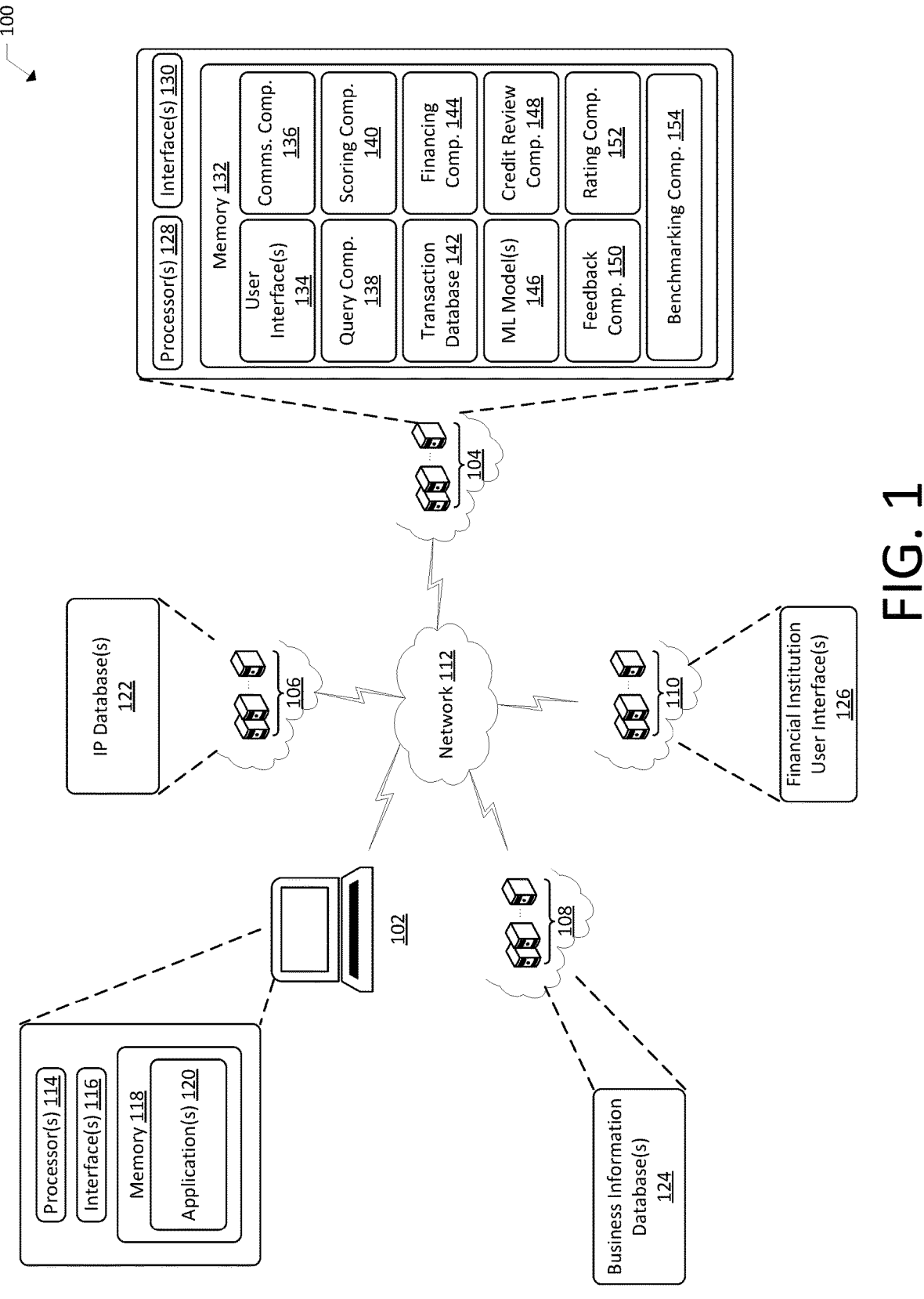
FIG. 1 illustrates a schematic diagram of an example environment for intellectual property model parameter training and utilization.

Systems and methods for intellectual property model parameter training and utilization are disclosed. Take, for example, a situation where an entity owns intellectual property assets. While those intellectual property assets may include any type of intellectual property, patent assets will be utilized by way of example throughout this disclosure. The entity may also desire to participate in a financing transaction and to utilize the intellectual property assets in association with the financing transaction. Example financing transactions may include acquiring a loan, asset transfers, etc. In these examples, the intellectual property assets may be utilized as collateral against default. In the loan example, a lender may lend a financing amount to the entity and may hold the intellectual property as collateral against default on the loan. The loan may also be insured by an insurer. In the event of default, the lender may make a claim to the insurer, and the insurer may pay on that claim assuming that the claim is meritorious. The insurer and/or the lender, depending on the terms of the arrangement, may acquire title to the intellectual property assets based on the default and/or may assert a right to sell those intellectual property assets in an attempt to recuperate some or all of the unpaid loan amount.

With these types of financial transactions, and for loans in general, a great deal of due diligence may be performed on the borrower and/or the collateralized assets to determine whether the loan should proceed. This due diligence can be very time consuming, expensive, not universally applied, subjective in nature, etc. To assist in determining whether attributes of a proposed financing transaction are sufficient for proceeding with the financing transaction, methods and architectures that can quickly receive, parse, and score intellectual property data and business data would be optimal.

To achieve these and other goals, the present disclosure describes a platform that is utilized to generate intellectual property quality scores associated with intellectual property assets. By way of example, a request may be received at an analysis system. The request may indicate that an entity has requested to participate in a financing transaction. Based at least in part on receiving the request, the analysis system may query one or more databases for information to generate the quality scores. For example, a first database associated with intellectual property data may be queried. Querying the first database may include utilizing an identifier of the entity, alternative identifiers of the entity, identifiers of one or more of the intellectual property assets, and/or any other means of identifying which intellectual property assets are associated with the entity in question. By way of specific example, a given loan request may indicate the intellectual property assets of the entity that the entity will offer as collateral against default of the loan. Identifiers of those intellectual property assets, such as patent numbers, may be utilized to query the first database. Additionally, a second database associated with business information may be queried. Querying the second database may include utilizing the entity identifier to obtain a portion of the business information in the second database that is attributable to the entity. Such business information may include revenue information, market information, product and/or service information, litigation information, and/or any other information related to the entity. In some examples, the results of the queries may be received at the analysis system, which may parse the results to ensure that relevant data is utilized to determine the quality scores. Also, in examples, one or more secure user interfaces may be utilized to acquire the data described herein. A communications component may be configured to send data to and/or receive data from the one or more devices associated with the entities in a secure manner, such as by utilizing encryption schemes, blockchain-related techniques, and/or secure user interfaces where access to the user interfaces is restricted and access control credentials are to be received prior to a user being able to utilize the secure user interfaces.

Once the intellectual property data and the business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure. It should be understood that the factors presented herein are illustrative and are not limiting. Indeed, the machine learning embodiments described herein discuss the identification and use of new factors over a period of time.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number the score should be 0) or near 0), if the number of issued patents satisfies the threshold number but does not satisfy another higher threshold number the score should be 0.5 or near 0.5, and if the number of issued patents satisfies the higher threshold the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example factor of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

For example, a financing component of the analysis system may be configured to receive the quality scores as generated herein and to utilize those quality scores to determine a financing amount to associate with a financial transaction and/or to determine a reasonableness of a requested financing amount for the financial transaction. To start, the quality scores described herein may be associated with a scale, such as from 0 to 100, with 0 being a lowest possible quality score and 100 being a highest quality score. It should be understood that other scales and scores may also be utilized and the 0-to-100 scale described herein is provided by way of example. The financing component may be configured to associate a given quality score on the scale with a financing amount based at least in part on transaction data from completed transactions. For example, a transactions database may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline.

In addition to the above, the financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amounts below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million, the upper and lower-limit financing thresholds may be set to, say, $5 million from the trendline. When the degree of variance is higher, such as between $1 million and $20 million, the upper and lower-limit financing thresholds may be set to, say, $20 million. It should be understood that the financing thresholds may not necessarily be based on the greatest variance from the trendline for a completed transaction, but instead may be configured to capture a significant portion of the completed transactions.

When the upper and lower-limit financing thresholds are determined, those thresholds may be utilized to determine a reasonableness of a request for financing. For example, a given financial transaction may be associated with a requested financing amount. The quality score for the intellectual property assets associated with the transaction may be determined and upper and lower-limit financing thresholds may be determined for that specific quality score. In examples where the requested financing amount is greater than the upper-limit financing threshold, an indication may be generated that the requested financing amount is too high and an indication of a more reasonable financing amount may be provided. In examples where the requested financing amount is less than the upper-limit financing threshold, an indication may be generated that the requested financing amount is appropriate. In examples where the requested financing amount is less than the lower-limit financing threshold, an indication of this determination may be generated and, in examples, a recommendation to increase the financing amount may be provided to at least the lower-limit financing threshold.

In addition to the above, a size of the intellectual property portfolio in question may be utilized to determine the reasonableness of the financing request. For example, a reasonable financing amount may vary more for a larger portfolio than for a smaller portfolio. By way of example, when analyzing the transaction data from the completed transactions, in addition to considering the actual financing amounts of the completed transactions, a degree of variance from those financing amounts may be determined and utilized to determine the trendline and/or upper and lower-limit financing thresholds. The degree of variance may be based at least in part on the size of the portfolios at issue in the completed transactions. Additionally, the size of the portfolio for a given financing request may be considered to determine whether the requested amount is reasonable.

Additionally, or alternatively, a credit review component of the analysis system may be configured to perform a credit review of the entity in question and to map the determined credit review score to the quality score. For example, the credit review component may be configured to query the business information database for information associated with the entity. The credit review component may be configured to parse the results from the query to obtain information useful for performing the credit review. The factors associated with the credit review score may include, for example, an amount of time the entity has been in business, a market share associated with the entity, revenue information associated with the entity, one or more financial trends associated with the entity such as whether revenue is increasing or decreasing, debt information, and/or one or more other factors that may impact the creditworthiness of the entity. In examples, one or more thresholds may be generated and utilized to differentiate between categories of credit review scores and quality scores. For example, a first credit review threshold may be at 60% of determined credit review scores while a second credit review threshold may be at 40% of the determined credit review scores. Similar quality score thresholds may also be determined. By associating the credit review scores and quality scores with thresholds, a matrix of compared credit review scores to quality scores may be generated. The matrix may be utilized to categorize given credit review and quality scores for one or more purposes, such as determining whether to proceed with due diligence for a given financing transaction and/or a level of due diligence to perform. For example, when a given credit review score satisfies the 60% credit review threshold but the quality score does not satisfy the 40% quality score, a determination may be made that such a financing transaction has been indicated as not being available for the fund at issue. However, if the quality score satisfies the 40% threshold and/or the 60% threshold, the financing transaction may be fast tracked or otherwise be associated with an indication that a lesser degree of due diligence is required to offer the financing to the entity at issue. By way of continued example, a credit review score that does not satisfy the 60% credit review threshold but does satisfy the 40% credit review threshold may be compared to the quality score at issue. If the quality score does not satisfy the 40% quality score threshold, the request for the financing transaction may be rejected and/or a recommendation to reject the transaction may be generated. If the quality score satisfies the 40% quality score threshold and/or the 60% quality score threshold, the request may be accepted but a greater degree of due diligence may be requested than with the fast tracked examples. Additionally, when the credit review score does not satisfy the 40% credit review threshold, regardless of the quality score, the request for the financing transaction may be rejected.

When determining one or more of the scores, thresholds, values, and/or recommendations described herein, one or more machine learning techniques may be utilized to determine those scores, thresholds, values, and/or recommendations. For example, depending on the value to be determined, a machine learning model may be generated that is configured to determine the value at issue. For example, the machine learning model may be configured to intake, as input, data the machine learning model is configured to utilize and to perform one or more operations to determine the value. Additionally, a training dataset may be generated and utilized to train the machine learning model such that a trained machine learning model is generated. The trained machine learning model may be utilized to determine the values described herein. Just by way of example, training of the machine learning models may result in determining the one or more weighting values associated with the quality score, identification of factors utilized to generate the quality score and/or subcomponents of the quality score, determining the credit review score, determining the credit review score thresholds, determining the quality score thresholds, determining the financing trendlines, determining the upper and/or low-limit financing thresholds, determining insurability thresholds, determining confidence degrees and thresholds, entity rating factors, etc.

Additionally, a feedback component of the analysis system may be configured to receive feedback data to hone the analyses described herein. For example, the feedback data may include indications of the dispositions of transactions where a quality score was provided. The dispositions may include that transactions being completed, a financing amount associated with the completed transaction, due diligence information from the completed transaction, the transactions being rejected, due diligence levels associated with the transactions, etc. This feedback data may be utilized to update one or more of the processes described herein for determining the quality score, the financing values, insurability determinations, due diligence determinations, credit review scores, etc.

Additionally, a rating component of the analysis system may be configured to rate the entity in association with one or more other entities. For example, a quality score may be generated in association with the entity. Additionally, one or more other quality scores may be generated in association with other entities. The other entities may include entities with intellectual property portfolios that are similar in one or more respects to the intellectual property assets of the entity in question, and/or the other entities may include entities associated with the same market(s) as the entity in question. In these examples, a market associated with the entity and/or the intellectual property assets may be determined and other entities associated with the market may also be identified. The intellectual property databases may be queried for intellectual property data associated with the other entities and quality scores for those portfolios may be determined as described herein. Thereafter, the rating component may rate the quality score for the entity against the other quality scores of the other entities. The rating may include ranking the quality scores and/or the rating may include indicating, qualitatively and/or quantitatively, how the intellectual property assets of the entity compare to the intellectual property portfolios of the other entities.

Additionally, a benchmarking component of the analysis system may be configured to perform benchmarking operations in association with the entity. For example, a given entity may desire to understand how that entity's intellectual property assets compare to those of another entity. The given entity may select the entity in question and request a benchmarking analysis to be performed. The intellectual property assets of the entity may be analyzed and/or one or more markets may be associated with those assets. Thereafter, data representing assets of the selected entity may be obtained and those assets may be parsed such that assets associated with the entity's market(s) are identified. Quality scores and/or other analyses may be performed on the entity's intellectual property assets and the assets from the selected entity's portfolio in the market(s) in question. This data may be presented to the entity to show how, for the comparable markets, the entity's intellectual property assets compare to those of the selected entity. Additionally, the benchmarking component may be configured to determine one or more entities to benchmark against based at least in part on an analysis of the intellectual property assets of the entity in question and/or the identified markets.

By utilizing the techniques described herein, accurate and quantitative analysis of large amounts of data can be performed in a matter of seconds to determine key attributes of a financing transaction. For example, huge amounts of data associated with intellectual property assets and business information can be parsed by the described analysis system to generate input datasets that are relevant and timely. Thereafter, a dynamic technique to generate quality scores, credit review scores, and financing amount values can be utilized to, again in a matter of seconds, determine whether a financing transaction request should proceed and a diligence level to associate with that financing transaction request. By so doing, immense computing and human resources are saved by determining a segment of requests that should not proceed, a segment that should proceed but that do not require the typical level of diligence, and segments associated with reasonable and unreasonable financing amounts. Having this accurate information at the frontend of a financing transaction request can show all parties involved important information to allow them to adjudge whether and to what extent continued resources should be put into the transaction. Indeed, the use of modeling, and particularly machine learning as described herein, to adapt the techniques on the fly to produce the most accurate results still in a matter of seconds demonstrates a robust computer-centric solution to the computer-centric problem of data parsing and on-the-fly value generation.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment for intellectual property model parameter training and utilization. The environment may include, for example, a client device 102, an analysis system 104, an intellectual property data system 106, a business information data system 108, and/or a financing institution system 110. Each of these components may be configured to communicate with each other, such as via a network 112.

The client devices 102 may include components such as, for example, one or more processors 114, one or more network interfaces 116, and/or memory 118. The memory 118 may include components such as, for example, one or more applications 120. As shown in FIG. 1, the client devices 102 may include, for example, a computing device, a mobile phone, a tablet, a laptop, and/or one or more servers. The components of the client device 102 will be described below by way of example. It should be understood that the example provided herein is illustrative, and should not be considered the exclusive example of the components of the client device 102. In examples, the applications 120 of the client device 102 may be configured to display user interfaces, such as secure user interfaces, and to receive user input. The user input may be associated with requests for financial transactions and/or may be in response to data sent from one or more of the systems described herein.

The intellectual property data system 106 may include one or more components such as, for example, one or more intellectual property databases 122. The intellectual property databases 122 may include intellectual property data representing intellectual property assets held by entities, such as all available patents and patent applications associated with one or many patent offices around the world.

The business information system 108 may include one or more components such as, for example, one or more business information databases 124. The business information databases 124 may include business information associated with the entities, whether or not they are associated with intellectual property assets. The business information may include any information associated with the business of the entity, such as, for example, revenue information, cost information, market identifiers, products, services, credit history, size, employee information, etc.

The financial institution system 110 may include one or more components such as, for example, one or more financial institution user interfaces 126. The user interfaces 126 may be utilized to view data associated with financial transactions, including financial transaction requests, the intellectual property data, the business information data, and/or at least portions of data associated with the analyses performed by the analysis system 104.

The analysis system 104 may include one or more components such as, for example, one or more processors 128, one or more network interfaces 130, and/or memory 132. The memory 132 may include one or more components such as, for example, one or more user interfaces 134, a communications component 136, a query component 138, a scoring component 140, a transaction database 142, a financing component 144, one or more machine learning models 146, a credit review component 148, a feedback component 150, a rating component 152, and/or a benchmarking component 154. These components of the analysis system 104 will be described in detail below.

By way of example, a request may be received at the analysis system 104. The request may indicate that an entity has requested to participate in a financing transaction. Based at least in part on receiving the request, the query component 138 may query one or more databases for information to generate quality scores. For example, the intellectual property database 122 associated with intellectual property data may be queried. Querying the intellectual property database 122 may include utilizing an identifier of the entity, alternative identifiers of the entity, identifiers of one or more of the intellectual property assets, and/or any other means of identifying which intellectual property assets are associated with the entity in question. By way of specific example, a given loan request may also indicate the intellectual property assets of the entity that the entity will offer as collateral against default of the loan. Identifiers of those intellectual property assets, such as patent numbers, may be utilized to query the intellectual property database 122. Additionally, the business information database 124 associated with business information may be queried. Querying the business information database 124 may include utilizing the entity identifier to obtain a portion of the business information in the business information database 124 that is attributable to the entity. Such business information may include revenue information, market information, product and/or service information, litigation information, and/or any other information related to the entity. In some examples, the results of the queries may be received at the analysis system 104, which may parse the results to ensure that relevant data is utilized to determine the quality scores. Also, in examples, one or more secure user interfaces 134 may be utilized to acquire the data described herein. The communications component 136 may be configured to send data to and/or receive data from the one or more devices and/or systems associated with the entities in a secure manner, such as by utilizing encryption schemes, blockchain-related techniques, and/or secure user interfaces where access to the user interfaces is restricted and access control credentials are to be received prior to a user being able to utilize the secure user interfaces.

Once the intellectual property data and the business information is acquired, the scoring component 140 may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the scoring component 140 may determine a score, a weighting to assign to the score, and a resulting weighted score. In examples, the score of each of the factors may be provided on a scale, such as a scale from 0 to 1. The scoring component 140 may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0 or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways. Additional details on the use of feedback data are provided elsewhere herein with respect to the feedback component 150.

Additionally, the financing component 144 may be configured to receive the quality scores as generated herein and to utilize those quality scores to determine a financing amount to associate with a financial transaction and/or to determine a reasonableness of a requested financing amount for the financial transaction. To start, the quality scores described herein may be associated with a scale, such as from 0 to 100, with 0 being a lowest possible quality score and 100 being a highest quality score. It should be understood that other scales and scores may also be utilized and the 0-to-100 scale described herein is provided by way of example. The financing component 144 may be configured to associate a given quality score on the scale with a financing amount based at least in part on transaction data from completed transactions. For example, the transaction database 142 may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline.

In addition to the above, the financing component 144 may be configured to determine an upper-limit financing threshold and a lower-limit financing threshold associated with given quality scores. For example, a variance from the trendline may be determined, such as +/-$20 million. Determining the variance may be based at least in part on analysis of the transaction data from the completed transactions. For example, the transaction data may indicate completed transactions with financing amounts that are higher and lower than the exact amount indicated by the trendline. However, the financing component 144 may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million. It should be understood that the financing thresholds may not necessarily be based on the greatest variance from the trendline for a completed transaction, but instead may be configured to capture a significant portion of the completed transactions.

When the upper and lower-limit financing thresholds are determined, those thresholds may be utilized to determine a reasonableness of a request for financing. For example, a given financial transaction may be associated with a requested financing amount. The quality score for the intellectual property assets associated with the transaction may be determined and upper and lower-limit financing thresholds may be determined for that specific quality score. In examples where the requested financing amount is greater than the upper-limit financing threshold, an indication may be generated that the requested financing amount is too high and an indication of a more reasonable financing amount may be provided. In examples where the requested financing amount is less than the upper-limit financing threshold, an indication may be generated that the requested financing amount is appropriate. In examples where the requested financing amount is less than the lower-limit financing threshold, an indication of this determination may be generated and, in examples, a recommendation to increase the financing amount may be provided to at least the lower-limit financing threshold.

In addition to the above, a size of the intellectual property portfolio in question may be utilized to determine the reasonableness of the financing request. For example, a reasonable financing amount may vary more for a larger portfolio than for a smaller portfolio. By way of example, when analyzing the transaction data from the completed transactions, in addition to considering the actual financing amounts of the completed transactions, a degree of variance from those financing amounts may be determined and utilized to determine the trendline and/or upper and lower-limit financing thresholds. The degree of variance may be based at least in part on the size of the portfolios at issue in the completed transactions. Additionally, the size of the portfolio for a given financing request may be considered to determine whether the requested amount is reasonable.

Additionally, or alternatively, the credit review component 148 may be configured to perform a credit review of the entity in question and to map the determined credit review score to the quality score. For example, the credit review component 148 may be configured to query the business information database 124 for information associated with the entity. The credit review component 148 may be configured to parse the results from the query to obtain information useful for performing the credit review. The factors associated with the credit review score may include, for example, an amount of time the entity has been in business, a market share associated with the entity, revenue information associated with the entity, one or more financial trends associated with the entity such as whether revenue is increasing or decreasing, debt information, and/or one or more other factors that may impact the creditworthiness of the entity. In examples, one or more thresholds may be generated and utilized to differentiate between categories of credit review scores and quality scores. For example, a first credit review threshold may be at 60% of determined credit review scores while a second credit review threshold may be at 40% of the determined credit review scores. Similar quality score thresholds may also be determined. By associating the credit review scores and quality scores with thresholds, a matrix of compared credit review scores to quality scores may be generated. The matrix may be utilized to categorize given credit review and quality scores for one or more purposes, such as determining whether to proceed with due diligence for a given financing transaction and/or a level of due diligence to perform. For example, when a given credit review score satisfies the 60% credit review threshold but the quality score does not satisfy the 40% quality score, a determination may be made that such a financing transaction has been indicated as not being available for the fund at issue. However, if the quality score satisfies the 40% threshold and/or the 60% threshold, the financing transaction may be fast tracked or otherwise be associated with an indication that a lesser degree of due diligence is required to offer the financing to the entity at issue. By way of continued example, a credit review score that does not satisfy the 60% credit review threshold but does satisfy the 40% credit review threshold may be compared to the quality score at issue. If the quality score does not satisfy the 40% quality score threshold, the request for the financing transaction may be rejected and/or a recommendation to reject the transaction may be generated. If the quality score satisfies the 40% quality score threshold and/or the 60% quality score threshold, the request may be accepted but a greater degree of due diligence may be requested than with the fast tracked examples. Additionally, when the credit review score does not satisfy the 40% credit review threshold, regardless of the quality score, the request for the financing transaction may be rejected.

When determining one or more of the scores, thresholds, values, and/or recommendations described herein, one or more machine learning techniques may be utilized to determine those scores, thresholds, values, and/or recommendations. For example, depending on the value to be determined, the machine learning model 146 may be generated that is configured to determine the value at issue. For example, the machine learning model 146 may be configured to intake, as input, data the machine learning model 146 is configured to utilize and to perform one or more operations to determine the value. Additionally, a training dataset may be generated and utilized to train the machine learning model 146 such that a trained machine learning model 146 is generated. The trained machine learning model 146 may be utilized to determine the values described herein. Just by way of example, training of the machine learning models 146 may result in determining the one or more weighting values associated with the quality score, identification of factors utilized to generate the quality score and/or subcomponents of the quality score, determining the credit review score, determining the credit review score thresholds, determining the quality score thresholds, determining the financing trendlines, determining the upper and/or low-limit financing thresholds, determining insurability thresholds, determining confidence degrees and thresholds, entity rating factors, etc.

Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

Additionally, the feedback component 150 may be configured to receive feedback data to hone the analyses described herein. For example, the feedback data may include indications of the dispositions of transactions where a quality score was provided. The dispositions may include that transactions being completed, a financing amount associated with the completed transaction, due diligence information from the completed transaction, the transactions being rejected, due diligence levels associated with the transactions, etc. This feedback data may be utilized to update one or more of the processes described herein for determining the quality score, the financing values, insurability determinations, due diligence determinations, credit review scores, etc.

Additionally, the rating component 152 may be configured to rate the entity in association with one or more other entities. For example, a quality score may be generated in association with the entity. Additionally, one or more other quality scores may be generated in association with other entities. The other entities may include entities with intellectual property portfolios that are similar in one or more respects to the intellectual property assets of the entity in question, and/or the other entities may include entities associated with the same market(s) as the entity in question. In these examples, a market associated with the entity and/or the intellectual property assets may be determined and other entities associated with the market may also be identified. The intellectual property databases may be queried for intellectual property data associated with the other entities and quality scores for those portfolios may be determined as described herein. Thereafter, the rating component 152 may rate the quality score for the entity against the other quality scores of the other entities. The rating may include ranking the quality scores and/or the rating may include indicating, qualitatively and/or quantitatively, how the intellectual property assets of the entity compare to the intellectual property portfolios of the other entities.

Additionally, the benchmarking component 154 may be configured to perform benchmarking operations in association with the entity. For example, a given entity may desire to understand how that entity's intellectual property assets compare to those of another entity. The given entity may select the entity in question and request a benchmarking analysis to be performed. The intellectual property assets of the entity may be analyzed and/or one or more markets may be associated with those assets. Thereafter, assets of the selected entity may be obtained and those assets may be parsed such that assets associated with the entity's market(s) are identified. Quality scores and/or other analyses may be performed on the entity's intellectual property assets and the assets from the selected entity's portfolio in the market(s) in question. This data may be presented to the entity to show how, for the comparable markets, the entity's intellectual property assets compare to those of the selected entity. Additionally, the benchmarking component 154 may be configured to determine one or more entities to benchmark against based at least in part on an analysis of the intellectual property assets of the entity in question and/or the identified markets.

As shown in FIG. 1, several of the components of the analysis system 104 and/or the other systems and devices, and the associated functionality of those components as described herein, may be performed by one or more of the other systems and/or by the client devices 102. Additionally, or alternatively, some or all of the components and/or functionalities associated with the client devices 102 may be performed by the analysis system 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 114 and/or 128, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114 and/or 128 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114 and/or 128 may possess its own local memory, which also may store program components, program data, and/or one or more operating systems.

The memory 118 and/or 132 may include volatile and nonvolatile memory, removable and non-removable media implemented in any method or technology for storage of information, such as computer-readable instructions, data structures, program component, or other data. Such memory 118 and/or 132 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or 132 may be implemented as computer-readable storage media ("CRSM"), which may be any available physical media accessible by the processor(s) 114 and/or 128 to execute instructions stored on the memory 118 and/or 132. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118 and/or 132, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 116 and/or 130 may enable messages between the components and/or devices shown in system 100 and/or with one or more other remote systems, as well as other networked devices. Such network interface(s) 116 and/or 130 may include one or more network interface controllers (NICs) or other types of transceiver devices to send and receive messages over the network 112.

For instance, each of the network interface(s) 116 and/or 130 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116 and/or 130 may include a wide area network (WAN) component to enable message over a wide area network.

In some instances, the analysis system 104 may be local to an environment associated the electronic device 102. For instance, the analysis system 104 may be located within the electronic device 102. In some instances, some or all of the functionality of the analysis system 104 may be performed by the electronic device 102. Also, while various components of the analysis system 104 have been labeled and named in this disclosure and each component has been described as being configured to cause the processor(s) to perform certain operations, it should be understood that the described operations may be performed by some or all of the components and/or other components not specifically illustrated.

FIG. 2 illustrates a conceptual diagram of details associated with generation of intellectual property quality scores. FIG. 2 shows example factors and sub-scores that may be utilized to generate the quality scores described herein. It should be understood that one or more modeling techniques may be utilized to determine the factors, apply input data to the factors to determine the various scores, determine the weightings, etc.

As shown in FIG. 2, to generate a quality score, subscores associated with a degree of coverage, a degree of opportunity, and a degree of exposure may be generated. For each of these sub-scores, one or more factors 202 may be considered. For each factor 202, a description 204 of the factor 202 may be provided, a score 206 for the factor may be determined, a weighting 208 for factor may be determined, and a weighted score 210 may be determined.

For example, factors 202 that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors 202 that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors 202 that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure. It should be understood that the factors 202 shown in FIG. 2 are provided by way of example and are not limiting. It should be noted that each of the degree of coverage, degree of opportunity, and degree of exposure are provided for convenience to show how factors 202 may be considered. In other words, factors 202 do not have to be categorized as shown in FIG. 2 or be subdivided into different categories.

For some or all of these factors 202, the analysis system described herein may determine a score 206, a weighting 208 to assign to the score 206, and a resulting weighted score 210. In examples, the score 206 of each of the factors may be provided on a scale, such as a scale from 0 to 1. The analysis system may be configured to determine values associated with the factors 202 (e.g., determine a number of issued patents) and apply one or more models and/or heuristics to determine how to score that factor. For example, when models are utilized, the models may be trained to determine that if the number of issued patents is less than a threshold number, the score 206 should be 0 or near 0, if the number of issued patents satisfies the threshold number but does not satisfy another higher threshold number, the score 206 should be 0.5 or near 0.5, and if the number of issued patents satisfies the higher threshold, the score 206 should be 1 or near 1. The thresholds and/or other benchmarks for any given factor 202 may be determined by model training and/or heuristics updates based on completed transaction data and/or other types of feedback data, which will be described in more detail below: In addition to the factor scoring, the weighting 208 may also be influenced by the models and/or heuristics as trained. Sticking with the example of the number of issued patents, the weighting 208 may be provided on a scale, such as from 0.1 to 2.0. That weighting 208 may be applied to the factor score 206 to generate the weighted score 210. For example, if a factor score 206 is 0.5 and the weighting 208 for that factor is 0.5, the weighted score 210 may be 0.25. Again, the weightings 208 for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

Figure 3:
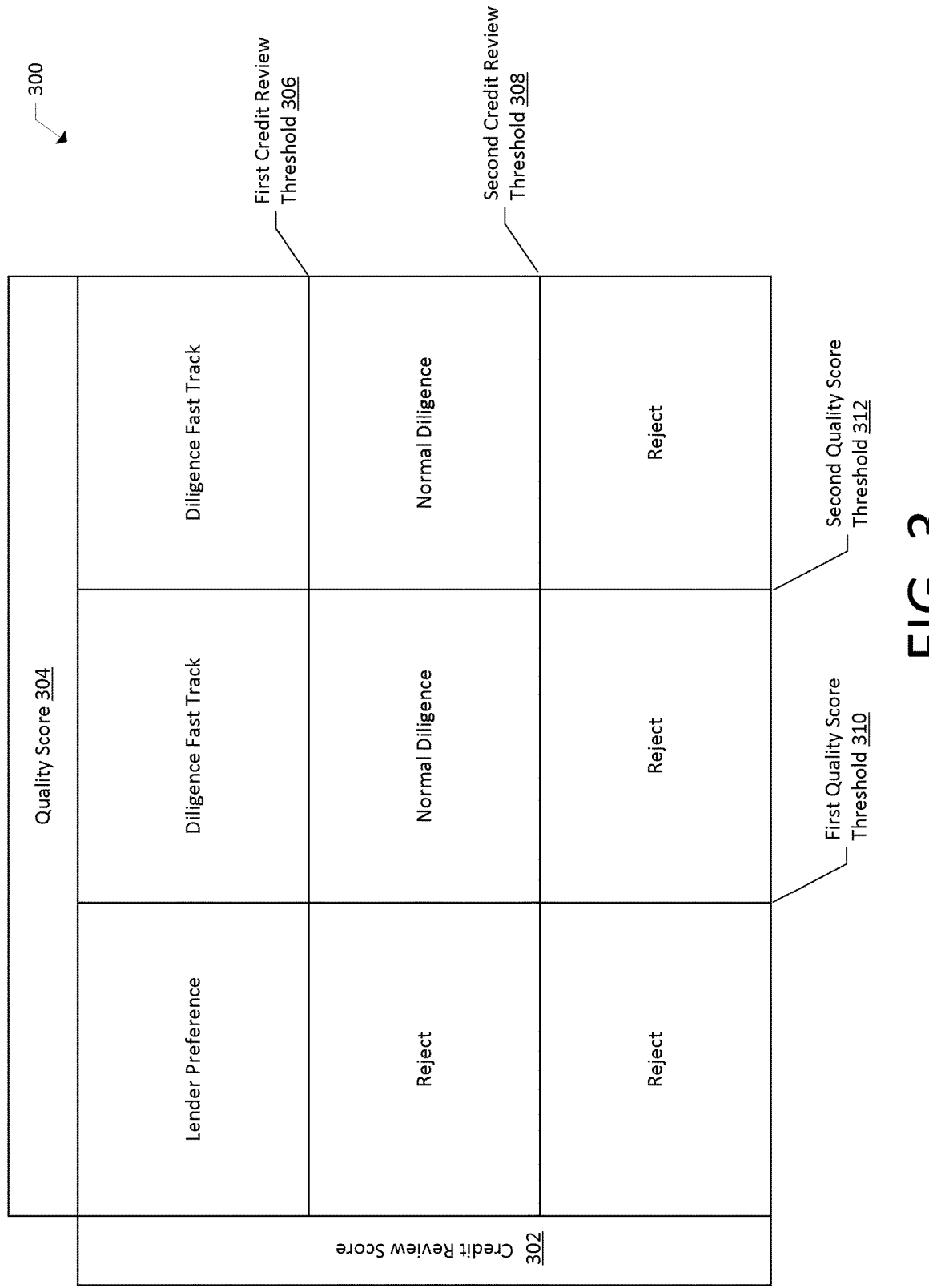
FIG. 3 illustrates a conceptual diagram of a comparison between quality scores and credit review scores.

FIG. 3 illustrates a conceptual diagram of a comparison between quality scores and credit review scores. FIG. 3 illustrates a matrix 300 of credit review scores 302 to quality scores 304. Additionally, FIG. 3 shows that cells of the matrix 300 are based on thresholds, such as a first credit review threshold 306, a second credit review threshold 308, a first quality score threshold 310, and a second quality score threshold 312. While two thresholds are depicted with respect to both the credit review scores and the quality scores, it should be understood that one, two, or more that two thresholds may be determined and used for the credit review scores and/or the quality scores.

To generate the matrix 300, a credit review component of the analysis system may be configured to perform a credit review of the entity in question and to map the determined credit review score to the quality score. For example, the credit review component may be configured to query the business information database for information associated with the entity. The credit review component may be configured to parse the results from the query to obtain information useful for performing the credit review: The factors associated with the credit review score may include, for example, an amount of time the entity has been in business, a market share associated with the entity, revenue information associated with the entity, one or more financial trends associated with the entity such as whether revenue is increasing or decreasing, debt information, and/or one or more other factors that may impact the creditworthiness of the entity.

In examples, the one or more thresholds 306-312 may be generated and utilized to differentiate between categories of credit review scores and quality scores. For example, the first credit review threshold 306 may be at 60% of determined credit review scores while the second credit review threshold 308 may be at 40% of the determined credit review scores. Similar quality score thresholds may also be determined. By associating the credit review scores and quality scores with thresholds, the matrix 300 of compared credit review scores to quality scores may be generated. The matrix 300 may be utilized to categorize given credit review and quality scores for one or more purposes, such as determining whether to proceed with due diligence for a given financing transaction and/or a level of due diligence to perform. For example, when a given credit review score satisfies the 60% credit review threshold 306 but the quality score does not satisfy the 40% quality score 310, a determination may be made that such a financing transaction has been indicated as not being available for the fund at issue. In other examples, this cell of the matrix may indicate that one or more lender preferences are to be considered when determining whether the financing transaction meets one or more criteria of the lender preferences. However, if the quality score satisfies the 40% threshold 310 and/or the 60% threshold 312, the financing transaction may be fast tracked or otherwise be associated with an indication that a lesser degree of due diligence is required to offer the financing to the entity at issue. By way of continued example, a credit review score that does not satisfy the 60% credit review threshold 306 but does satisfy the 40% credit review threshold 308 may be compared to the quality score at issue. If the quality score does not satisfy the 40% quality score threshold 310, the request for the financing transaction may be rejected and/or a recommendation to reject the transaction may be generated. If the quality score satisfies the 40% quality score threshold 310 and/or the 60% quality score threshold 312, the request may be accepted but a greater degree of due diligence may be requested than with the fast tracked examples. Additionally, when the credit review score does not satisfy the 40% credit review threshold 308, regardless of the quality score, the request for the financing transaction may be rejected.

Figure 4:
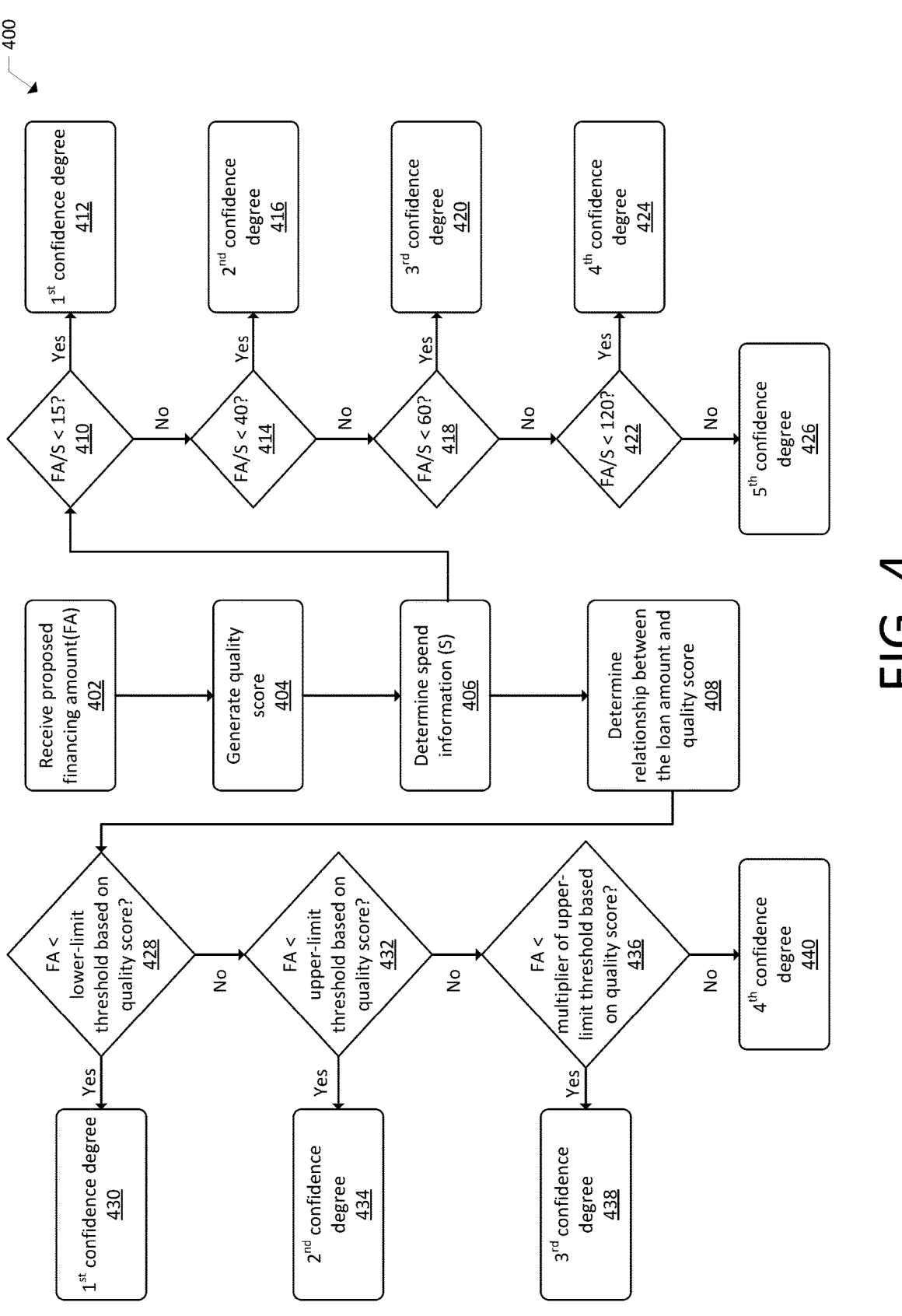
FIG. 4 illustrates a flow diagram of an example process for determining confidence values associated with intellectual property assets.

FIG. 4 illustrates processes associated with intellectual property model parameter training and utilization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 5-19, although the processes may be implemented in a wide variety of other environments, architectures and systems.

FIG. 4 illustrates a flow diagram of an example process 400 for determining confidence values associated with intellectual property assets. The order in which the operations or steps are described is not intended to be construed as a limitation, and any number of the described operations may be combined in any order and/or in parallel to implement process 400. The operations described with respect to the process 400 are described as being performed by a client device, and/or a system associated with the document analysis platform. However, it should be understood that some or all of these operations may be performed by some or all of components, devices, and/or systems described herein.

At block 402, the process 400 may include receiving a proposed financing amount (FA). For example, a request associated with a financing transaction may be received and the request may indicate the proposed financing amount for the financing transaction.

At block 404, the process 400 may include generating a quality score. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

At block 406, the process 400 may include determining spend information(S) associated with the entity. For example, the business information may be parsed to determine a spend of the entity over a certain period of time, such as 10 years for example. The spend may be associated with one or more categories, but in examples, the spend may be associated with funds spent on developing the intellectual property assets.

At block 408, the process 400 may include determining a relationship between the funding amount and the quality score associated with the intellectual property assets in question.

The process 400 may then proceed down one or more of the paths starting at block 410 and block 428.

At block 410, the process 400 may include determining whether a ratio of the proposed financing amount to the spend of the entity is less than a threshold, such as 15. By so doing, the system may determine a magnitude of the proposed financing amount in relation to how much is spent by the entity over a period of time associated with the financing transaction.

In examples where the ratio is less than the threshold, then at block 412 the process 400 may include associating a first confidence degree with the financing transaction. The first confidence degree may indicate that the financing transaction is a very good candidate to be accepted and/or may indicate that a lesser degree of due diligence is required to close the transaction.

In examples where the ratio is not less than the 15 threshold, the process 400 may include, at block 414, determining whether the ratio is less than a second threshold, such as 40.

In examples where the ratio is less than the 40 threshold, then at block 416 the process 400 may include associating a second confidence degree with the financing transaction. In this example, the second confidence degree may indicate a lesser degree of confidence than the first confidence degree. This second confidence degree may still indicate that the financing transaction is a good candidate to be accepted, but not as good as the example provided above, and/or that an increased level of due diligence should be performed.

In examples where the ratio is not less than the 40 threshold, the process 400 may include, at block 418, determining whether the ratio is less than a third threshold, such as 60.

In examples where the ratio is less than the 60 threshold, then at block 420 the process 400 may include associating a third confidence degree with the financing transaction. In this example, the third confidence degree may indicate a lesser degree of confidence than the second confidence degree. The third confidence degree may indicate that the financing transaction is just as likely to be accepted as to not be accepted and/or that a higher level of due diligence is required.

In examples where the ratio is not less than the 60 threshold, the process 400 may include, at block 422, determining whether the ratio is less than a fourth threshold, such as 120.

In examples where the ratio is less than the 120 threshold, the process 400 may include, at block 424, associating a fourth confidence degree with the financing transaction. In this example, the fourth confidence degree may indicate a lesser degree of confidence than the third confidence degree. The fourth confidence degree may indicate that the financing transaction is not likely to be accepted.

In examples where the ratio is not less than the 120 threshold, the process 400 may include, at block 426, associating a fifth confidence degree with the financing transaction. In this example, the fifth confidence degree may indicate a lesser degree of confidence than the fourth confidence degree. The fifth confidence degree may indicate that the financing transaction is not a good candidate to be accepted.

In addition or alternatively from the processes described with respect to blocks 410-426, the process 400 may include, at block 428, determining whether the proposed financing amount is less than a lower-limit threshold determined based on the quality score. For example, a financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million. It should be understood that the financing thresholds may not necessarily be based on the greatest variance from the trendline for a completed transaction, but instead may be configured to capture a significant portion of the completed transactions.

In examples where the proposed financing amount is less than the lower-limit threshold, the process 400 may include, at block 430, associating the financing transaction with the first confidence degree.

In examples where the proposed financing amount is not less than the lower-limit threshold, the process 400 may include, at block 432, determining whether the proposed financing amount is less than the upper-limit financing threshold based on the quality score.

In examples where the proposed financing amount is less than the upper-limit threshold, the process 400 may include, at block 434, associating the financing threshold with the second confidence degree.

In examples where the proposed financing amount is not less than the upper-limit threshold, the process 400 may include, at block 436, determining whether the proposed financing amount is less than a predetermined multiplier of the upper-limit financing threshold In examples where the proposed financing amount is less than the predetermined multiplier, the process 400 may include, at block 438, associating the financing transaction with the third confidence degree.

In examples where the proposed financing amount is not less than the predetermined multiplier, the process 400 may include, at block 440, associating the financing transaction with the fourth confidence degree.

Figure 5:
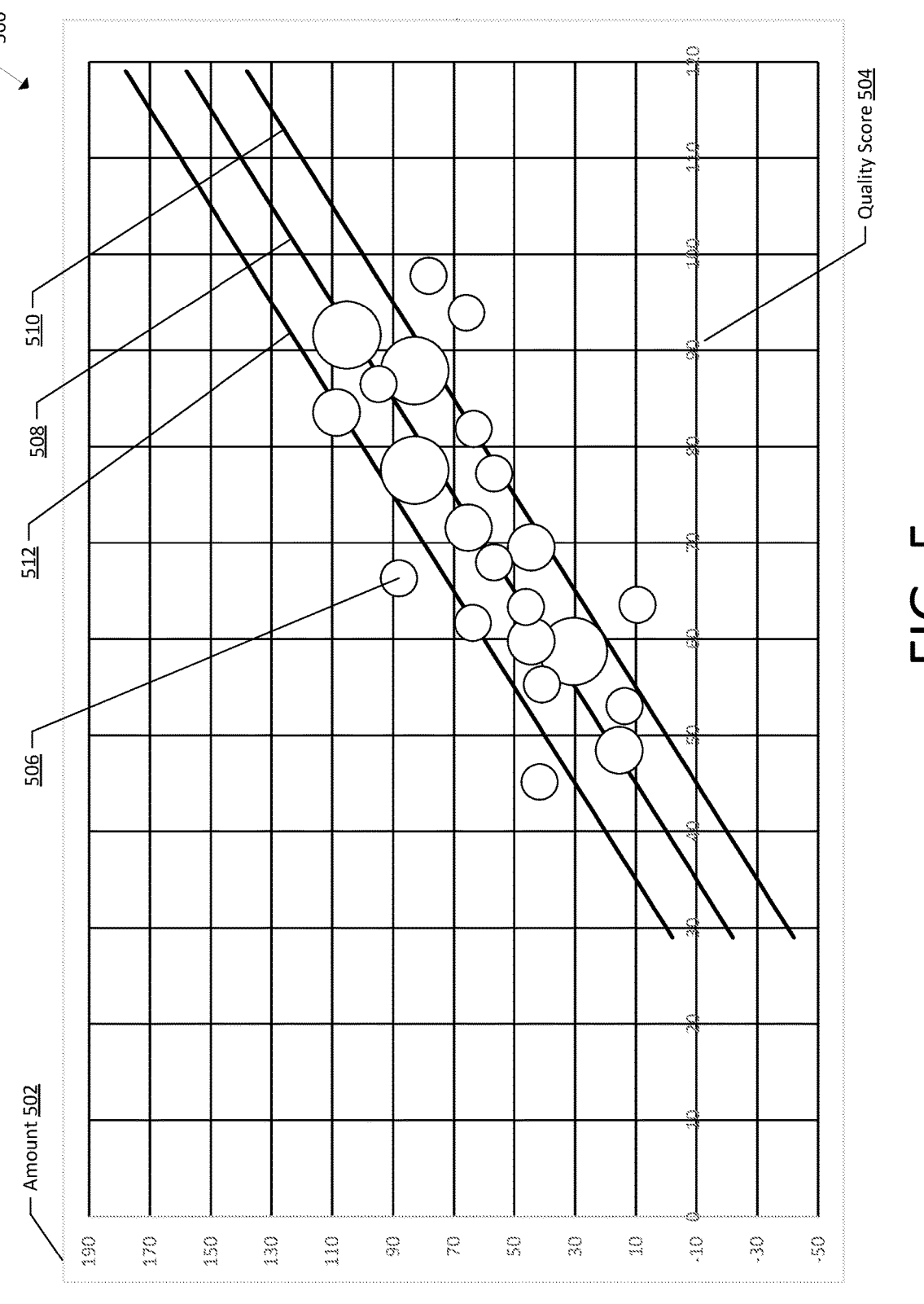
FIG. 5 illustrates a graph showing upper-limit and lower-limit financing thresholds.

FIG. 5 illustrates a graph 500 illustrating upper-limit and lower-limit financing thresholds. The graph 500 is meant as one form of data comparison, but should not be construed as a limitation. The graph 500 depicts a scale of quality scores 504 on the x-axis and a scale of financing amounts 502 on the y-axis. Additionally, the circles illustrate completed transactions 506, with the radius of the circles illustrating a size of an intellectual property portfolio associated with the completed transactions 506. The graph 500 also depicts a trendline 508, a lower-limit financing threshold 510, and an upper-limit financing threshold 512.

A financing component may be configured to associate a given quality score on the scale with a financing amount based at least in part on transaction data from completed transactions. For example, a transactions database may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline 508 may indicate a financing amount associated with a given quality score on the scale. For example, the trendline 506 may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline 500 described here is linear, it should be understood that the trendline 500 may not be linear. Utilizing the trendline 500 described herein, a financing amount to attribute to a given financial transaction may be determined by mapping the quality score determined for the financial transaction to the amount indicated by the trendline.

In addition to the above, the financing component may be configured to determine the upper-limit financing threshold 512 and the lower-limit financing threshold 510 associated with given quality scores. For example, a variance from the trendline 508 may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline 508. However, the financing component may determine a degree of variance from the trendline for the completed transactions 506 to determine what the upper and lower-limit financing thresholds 510, 512 should be. For example, a given set of completed transactions 506 may indicate that 10 transactions were completed with financing amounts above the trendline 508 and 10 transaction were completed with financing amount below the trendline 508. Of the 10 transactions above the trendline 508 and the 10 transactions below the trendline 508, the difference between the financing amount and the amount indicated by the trendline 508 may be determined. In situations where the degree of variance of the 20 transactions is relatively small, such as typically between $1 million and $5 million difference, the upper and lower-limit financing thresholds 510,

512 may be set to, say, $5 million from the trendline 508. When the degree of variance is higher, such as between $1 million and $20 million, the upper and lower-limit financing thresholds 510, 512 may be set to, say, $20 million. It should be understood that the financing thresholds may not necessarily be based on the greatest variance from the trendline for a completed transaction, but instead may be configured to capture a significant portion of the completed transactions.

Figure 6:
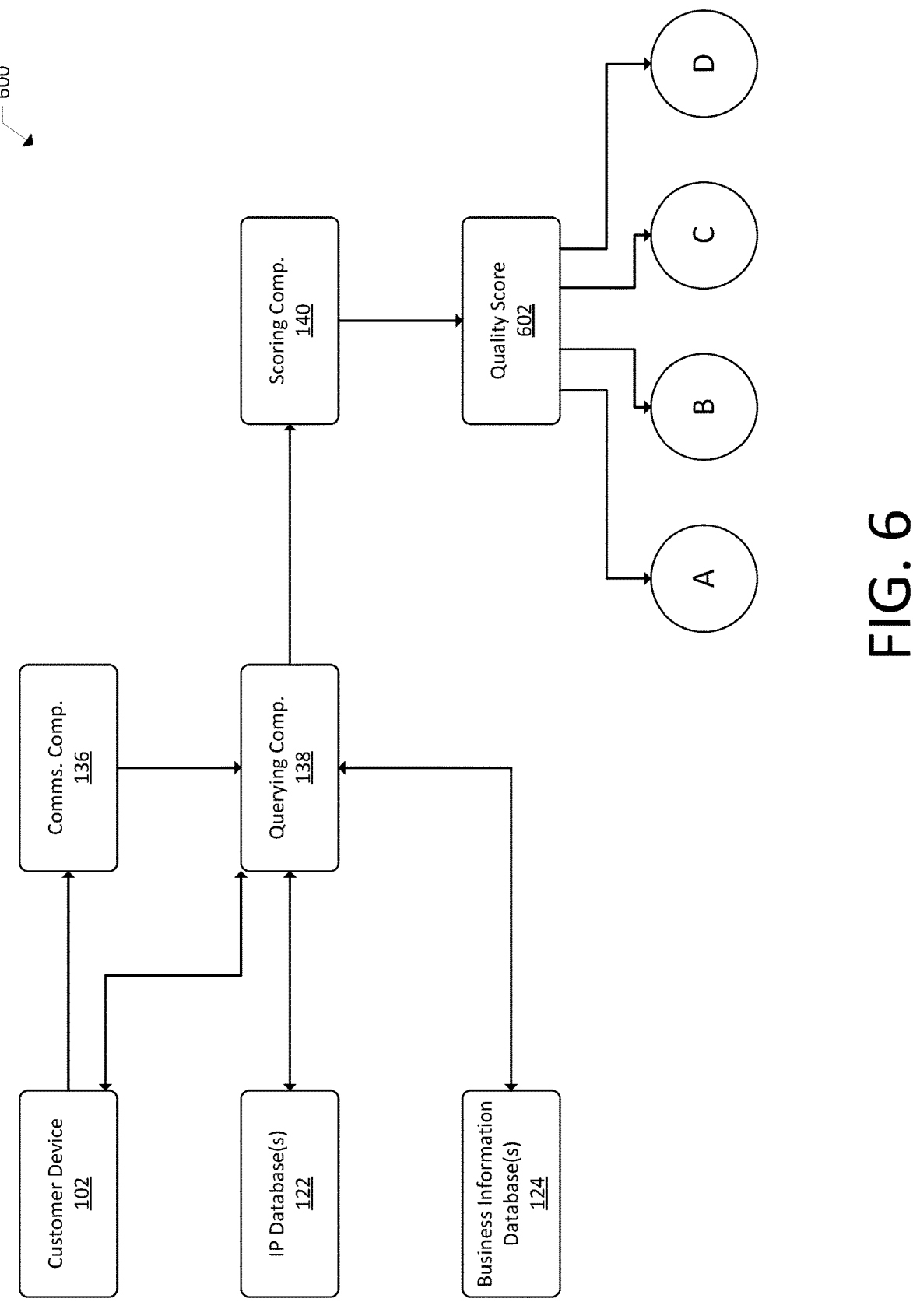
FIG. 6 illustrates a conceptual diagram of example components utilized to generate an intellectual property quality score.

FIG. 6 illustrates a conceptual diagram of example components utilized to generate an intellectual property quality score. The components may be the same as or similar to the components described with respect to FIG. 1. For example, the components may include a customer device 102, an intellectual property database 122, a business information database 124, a communications component 136, a querying component 138, and/or a scoring component 140. Some or all of these components may be utilized to generate one or more quality scores 602 to be utilized for one or more applications, illustrated in FIG. 6 as A-D.

For example, a request may be received at an analysis system from the client device 102 by the communications component 136. The request may indicate that an entity has requested to participate in a financing transaction. Based at least in part on receiving the request, the query component 138 may query one or more databases for information to generate quality scores. For example, the intellectual property database 122 associated with intellectual property data may be queried. Querying the intellectual property database 122 may include utilizing an identifier of the entity, alternative identifiers of the entity, identifiers of one or more of the intellectual property assets, and/or any other means of identifying which intellectual property assets are associated with the entity in question. By way of specific example, a given loan request may also indicate the intellectual property assets of the entity that the entity will offer as collateral against default of the loan. Identifiers of those intellectual property assets, such as patent numbers, may be utilized to query the intellectual property database 122. Additionally, the business information database 124 associated with business information may be queried. Querying the business information database 124 may include utilizing the entity identifier to obtain a portion of the business information in the business information database 124 that is attributable to the entity. Such business information may include revenue information, market information, product and/or service information, litigation information, and/or any other information related to the entity. In some examples, the results of the queries may be received at the analysis system 104, which may parse the results to ensure that relevant data is utilized to determine the quality scores. Also, in examples, one or more secure user interfaces 134 may be utilized to acquire the data described herein. The communications component 136 may be configured to send data to and/or receive data from the one or more devices and/or systems associated with the entities in a secure manner, such as by utilizing encryption schemes, blockchain-related techniques, and/or secure user interfaces where access to the user interfaces is restricted and access control credentials are to be received prior to a user being able to utilize the secure user interfaces.

Once the intellectual property data and the business information is acquired, the scoring component 140 may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the scoring component 140 may determine a score, a weighting to assign to the score, and a resulting weighted score. In examples, the score of each of the factors may be provided on a scale, such as a scale from 0 to 1. The scoring component 140 may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0 or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores 602 may be generated and utilized in one or more ways, as will be described below with respect to FIGS. 7-10.

Figure 7:
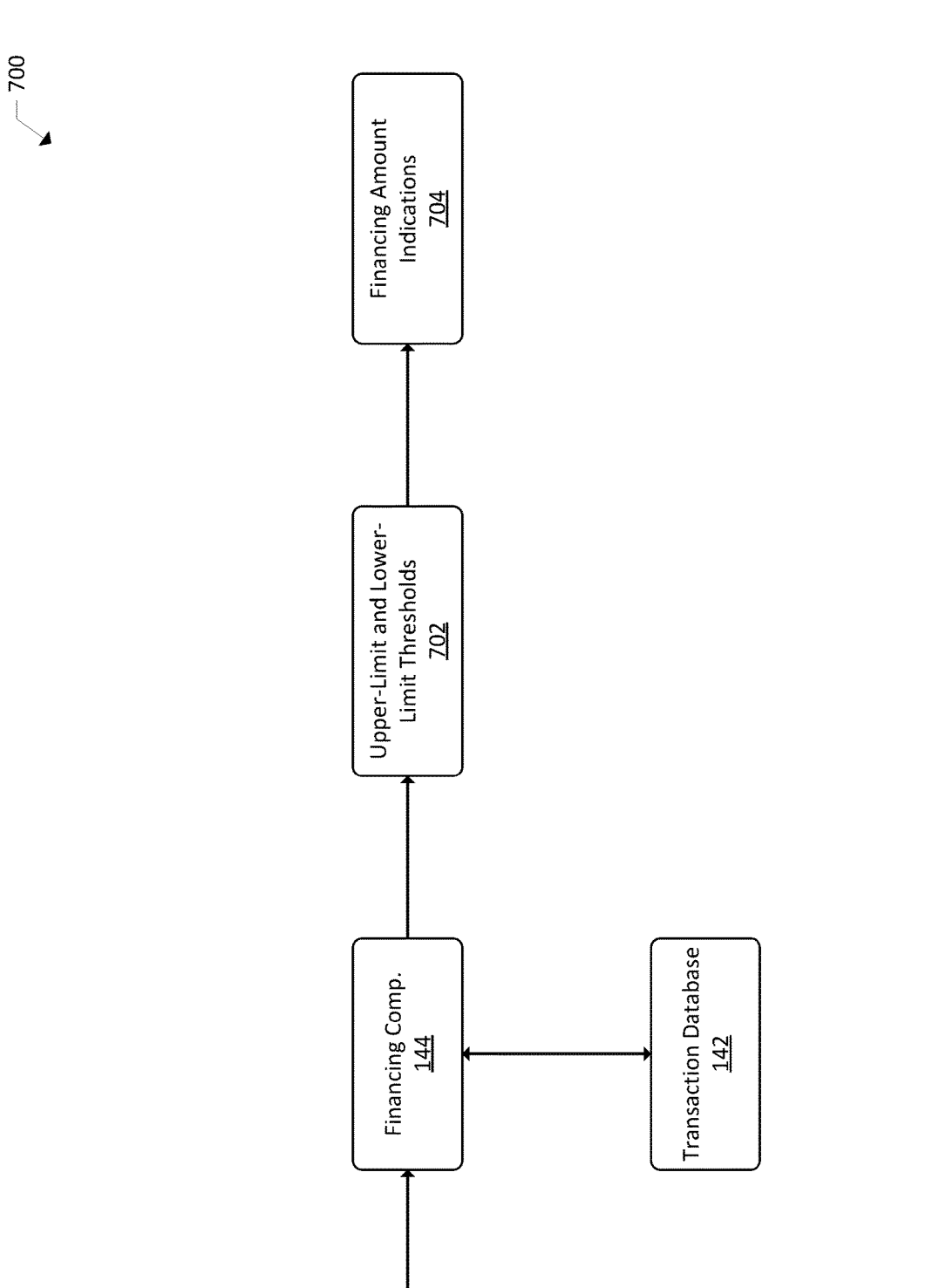
FIG. 7 illustrates a conceptual diagram of example components that utilize a quality score to generate financing amount indications.

FIG. 7 illustrates a conceptual diagram of example components that utilize a quality score to generate financing amount indications. The components of FIG. 7 may be the same or similar to those described with respect to FIG. 1. For example, FIG. 7 may include a financing component 144 and/or a transaction database 142. FIG. 7 may start where FIG. 6 concluded at the operation notated as "A," where the quality score 602 may be utilized to generate one or more financing amount indications as described herein.

For example, the financing component 144 may be configured to receive the quality scores as generated herein and to utilize those quality scores to determine a financing amount to associate with a financial transaction and/or to determine a reasonableness of a requested financing amount for the financial transaction. To start, the quality scores described herein may be associated with a scale, such as from 0 to 100, with 0 being a lowest possible quality score and 100 being a highest quality score. It should be understood that other scales and scores may also be utilized and the 0-to-100 scale described herein is provided by way of example. The financing component 144 may be configured to associate a given quality score on the scale with a financing amount based at least in part on transaction data from completed transactions. For example, the transaction database 142 may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline.

In addition to the above, the financing component 144 may be configured to determine an upper-limit financing threshold and a lower-limit financing threshold associated with given quality scores at block 702. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component 144 may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million. It should be understood that the financing thresholds may not necessarily be based on the greatest variance from the trendline for a completed transaction, but instead may be configured to capture a significant portion of the completed transactions.

When the upper and lower-limit financing thresholds are determined, those thresholds may be utilized to determine a reasonableness of a request for financing. For example, a given financial transaction may be associated with a requested financing amount. The quality score for the intellectual property assets associated with the transaction may be determined and upper and lower-limit financing thresholds may be determined for that specific quality score. In examples where the requested financing amount is greater than the upper-limit financing threshold, an indication may be generated that the requested financing amount is too high and an indication of a more reasonable financing amount may be provided. In examples where the requested financing amount is less than the upper-limit financing threshold, an indication may be generated that the requested financing amount is appropriate. In examples where the requested financing amount is less than the lower-limit financing threshold, an indication of this determination may be generated and, in examples, a recommendation to increase the financing amount may be provided to at least the lower-limit financing threshold.

In addition to the above, a size of the intellectual property portfolio in question may be utilized to determine the reasonableness of the financing request. For example, a reasonable financing amount may vary more for a larger portfolio than for a smaller portfolio. By way of example, when analyzing the transaction data from the completed transactions, in addition to considering the actual financing amounts of the completed transactions, a degree of variance from those financing amounts may be determined and utilized to determine the trendline and/or upper and lower-limit financing thresholds. The degree of variance may be based at least in part on the size of the portfolios at issue in the completed transactions. Additionally, the size of the portfolio for a given financing request may be considered to determine whether the requested amount is reasonable.

At block 704, one or more financing amount indications may be provided based on the above analysis. The financing amount indications may include an indication that a requested financing amount is approved or not approved, a reasonable financing amount, upper and lower-limit financing thresholds, portfolio sizes, an average or trendline financing amount, insurability indications, etc.

FIG. 8 illustrates a conceptual diagram of example components that utilize a quality score in comparison with credit review scores. The components of FIG. 8 may be the same or similar to those described with respect to FIG. 1. For example, FIG. 8 may include a credit review component 148 and/or a business information database 124. FIG. 8 may start where FIG. 6 concluded at the operation notated as "B." where the quality score 304 may be utilized to generate one or more financing indications 802 as described herein.

For example, the credit review component 148 may be configured to perform a credit review of the entity in question and to map the determined credit review score 302 to the quality score 304. For example, the credit review component 148 may be configured to query the business information database 124 for information associated with the entity. The credit review component 148 may be configured to parse the results from the query to obtain information useful for performing the credit review. The factors associated with the credit review score 302 may include, for example, an amount of time the entity has been in business, a market share associated with the entity, revenue information associated with the entity, one or more financial trends associated with the entity such as whether revenue is increasing or decreasing, debt information, and/or one or more other factors that may impact the creditworthiness of the entity. In examples, one or more thresholds may be generated and utilized to differentiate between categories of credit review scores 302 and quality scores 304.

For example, a first credit review threshold may be at 60% of determined credit review scores 302 while a second credit review threshold may be at 40% of the determined credit review scores 302. Similar quality score thresholds may also be determined. By associating the credit review scores 302 and quality scores 304 with thresholds, a matrix of compared credit review scores 302 to quality scores 304 may be generated. The matrix may be utilized to categorize given credit review and quality scores for one or more purposes, such as determining whether to proceed with due diligence for a given financing transaction and/or a level of due diligence to perform.

For example, when a given credit review score 302 satisfies the 60% credit review threshold but the quality score 304 does not satisfy the 40% quality score, a determination may be made that such a financing transaction has been indicated as not being available for the fund at issue. In other examples, this cell of the matrix may indicate that one or more lender preferences are to be considered when determining whether the financing transaction meets one or more criteria of the lender preferences. However, if the quality score 304 satisfies the 40% threshold and/or the 60% threshold, the financing transaction may be fast tracked or otherwise be associated with an indication that a lesser degree of due diligence is required to offer the financing to the entity at issue. By way of continued example, a credit review score 302 that does not satisfy the 60% credit review threshold but does satisfy the 40% credit review threshold may be compared to the quality score 304 at issue. If the quality score 304 does not satisfy the 40% quality score threshold, the request for the financing transaction may be rejected and/or a recommendation to reject the transaction may be generated. If the quality score 304 satisfies the 40% quality score threshold and/or the 60% quality score threshold, the request may be accepted but a greater degree of due diligence may be requested than with the fast tracked examples. Additionally, when the credit review score 302 does not satisfy the 40% credit review threshold, regardless of the quality score 304, the request for the financing transaction may be rejected.

Financing indications 802 such as those described above may be generated utilizing the matrix. It should be understood that the financing indications may include the credit review score 302, the quality score 304, a placement in the matrix described above, and/or any other information associated with the matrix.

Figure 9:
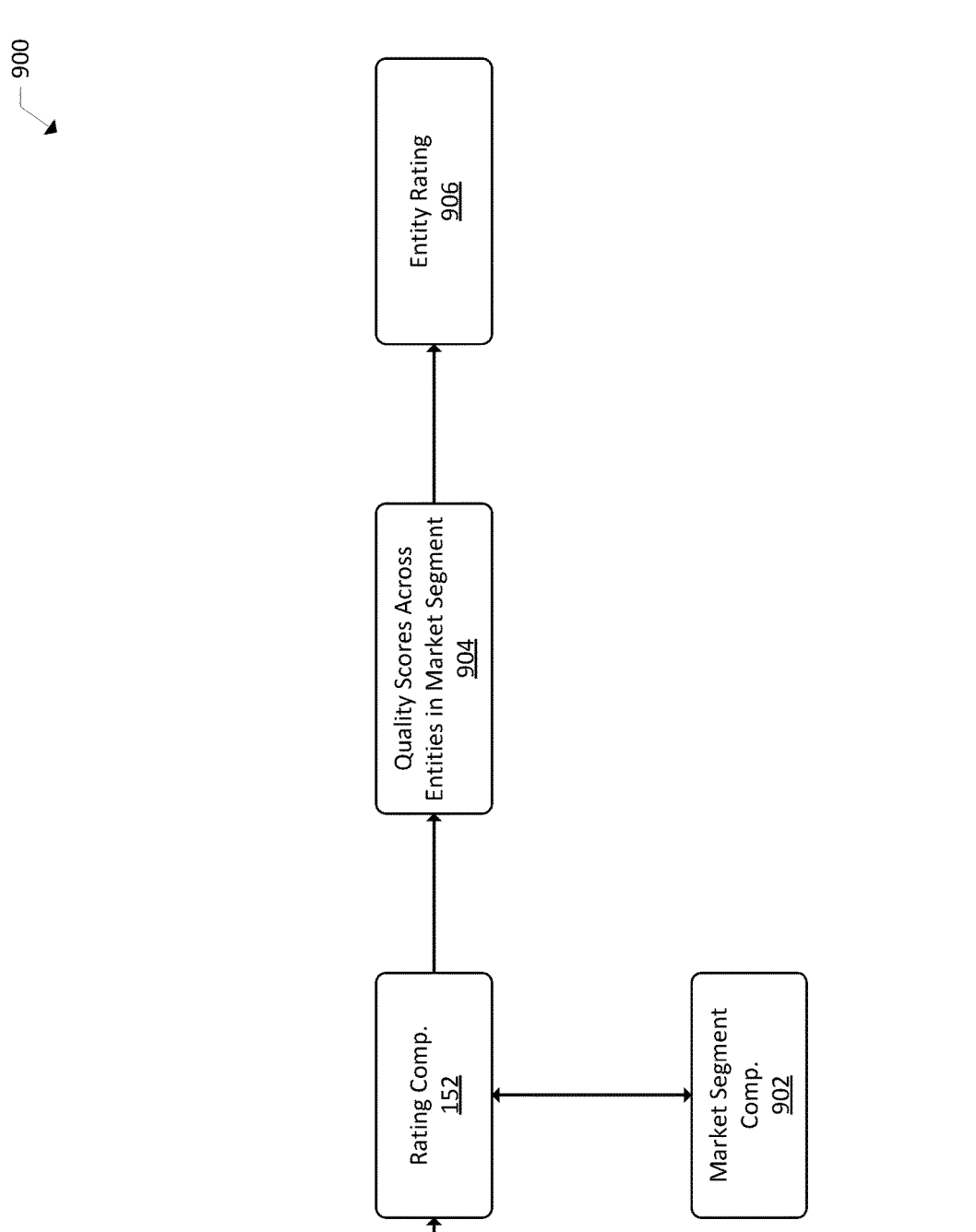
FIG. 9 illustrates a conceptual diagram of example components that utilize a quality score to perform entity rating.

FIG. 9 illustrates a conceptual diagram of example components that utilize a quality score to perform entity rating. The components of FIG. 9 may be the same or similar to those described with respect to FIG. 1. For example, FIG. 9 may include a rating component 152. FIG. 9 may start where FIG. 6 concluded at the operation notated as "C," where the quality score may be utilized to generate an entity rating 906 as described herein.

For example, the rating component 152 may be configured to rate the entity in association with one or more other entities. For example, a quality score may be generated in association with the entity. Additionally, one or more other quality scores may be generated in association with other entities. A market segment component 902 may be queried to determine one or more market segments associated with the entity and/or the intellectual property assets of the entity. That market segment data may be utilized to identify the other entities. The other entities may include entities with intellectual property portfolios that are similar in one or more respects to the intellectual property assets of the entity in question, and/or the other entities may include entities associated with the same market(s) as the entity in question. In these examples, a market associated with the entity and/or the intellectual property assets may be determined and other entities associated with the market may also be identified. At block 904, the intellectual property databases may be queried for intellectual property data associated with the other entities and quality scores for those portfolios may be determined as described herein.

Thereafter, the rating component 152 may rate the quality score for the entity against the other quality scores of the other entities. The rating may include ranking the quality scores and/or the rating may include indicating, qualitatively and/or quantitatively, how the intellectual property assets of the entity compare to the intellectual property portfolios of the other entities.

FIG. 10 illustrates a conceptual diagram of example components that utilize a quality score to generate benchmarking indications. The components of FIG. 10 may be the same or similar to those described with respect to FIG. 1. For example, FIG. 10 may include a benchmarking component 154 and/or a customer device. FIG. 10 may start where FIG. 6 concluded at the operation notated as "D," where the quality score may be utilized to provide one or more benchmarking indications as described herein.

For example, the benchmarking component 154 may be configured to perform benchmarking operations in association with the entity. For example, a given entity may desire to understand how that entity's intellectual property assets compare to those of another entity. The given entity may select the entity in question and request a benchmarking analysis to be performed. Input data associated with the selected entity may be received from the client device 102. The intellectual property assets of the entity may be analyzed and/or one or more markets may be associated with those assets.

Thereafter, assets of the selected entity may be obtained and those assets may be parsed such that assets associated with the entity's market(s) are identified. Quality scores and/or other analyses may be performed on the entity's intellectual property assets and the assets from the selected entity's portfolio in the market(s) in question. This data may be presented to the entity, such as via one or more user interfaces, to show how, for the comparable markets, the entity's intellectual property assets compare to those of the selected entity. Additionally, the benchmarking component 154 may be configured to determine one or more entities to benchmark against based at least in part on an analysis of the intellectual property assets of the entity in question and/or the identified markets. These benchmarking indication 1002 may be presented to the entity such as via user interfaces displayed on the client device 102.

FIGS. 11-19 illustrate processes associated with intellectual property model parameter training and utilization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-10, although the processes may be implemented in a wide variety of other environments, architectures and systems.

Figure 11:
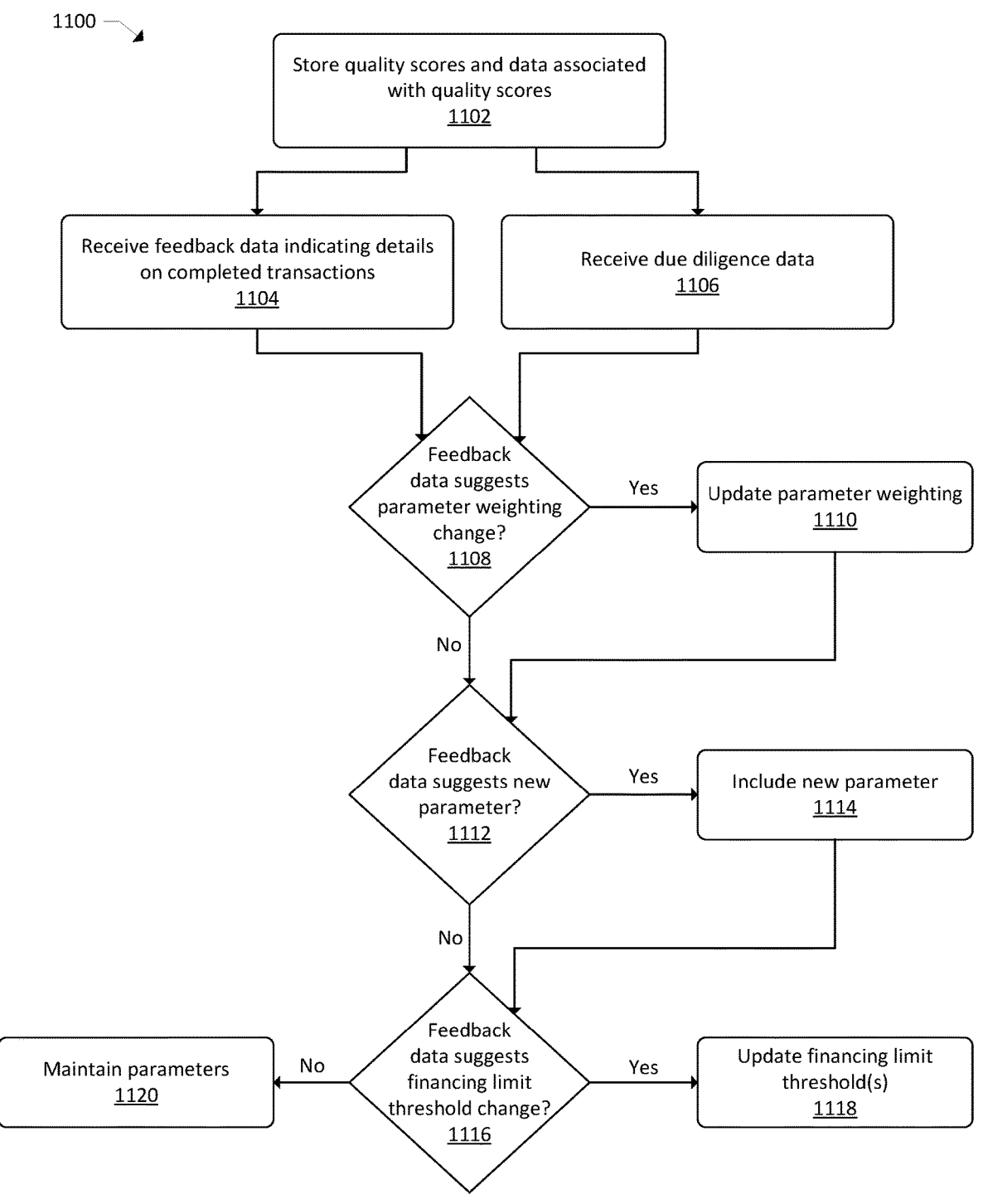
FIG. 11 illustrates a flow diagram of an example process for utilizing feedback data.

FIG. 11 illustrates a flow diagram of an example process 1100 for utilizing feedback data. The order in which the operations or steps are described is not intended to be construed as a limitation, and any number of the described operations may be combined in any order and/or in parallel to implement process 1100. The operations described with respect to the process 1100 are described as being performed by a client device, and/or a system associated with the document analysis platform. However, it should be understood that some or all of these operations may be performed by some or all of components, devices, and/or systems described herein.

At block 1102, the process 1100 may include storing quality score and data associated with quality scores. For example, the quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the scoring component may determine a score, a weighting to assign to the score, and a resulting weighted score. In examples, the score of each of the factors may be provided on a scale, such as a scale from 0 to 1. The scoring component may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0) or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1104, the process 1100 may include receiving feedback data indicating details on completed transactions. For example, the feedback data may include indications of the dispositions of transactions where a quality score was provided. The dispositions may include that transactions being completed, a financing amount associated with the completed transaction, the transactions being rejected, due diligence levels associated with the transactions, etc. This feedback data may be utilized to update one or more of the processes described herein for determining the quality score, the financing values, insurability determinations, due diligence determinations, credit review scores, etc.

At block 1106, the process 1100 may include receiving due diligence data. The due diligence data may indicate, for a given financing transaction, whether positive or negative indications of asset quality and/or entity insurability were determined along with other information associated with the intellectual property assets. The other information include details on a valuation of the assets, additional details on litigation-related events associated with the assets, identification of potential licensees for the assets, validity concerns associated with the assets, estoppel information, assignee issues associated with the assets, etc.

At block 1108, the process 1100 may include determining whether the feedback data suggests a parameter weighting change is merited. For example, as described above, the quality score may be determined from several sub-scores as well as factors and weightings associated with the sub-scores. Each of these factors (described here as parameters, such as modeling parameters) may be associated with its own weighting. The feedback data and indicate that one or more of these weightings should be changed. For example, a first weighting associated with patent application filing velocity may be initially set for that factor. The feedback data may indicate that completed transactions with certain filing velocities are accepted at a high rate and/or are associated with higher financing amounts. In this example, the weighting for the filing velocity parameter may be updated such that the factor is more important to the overall quality score. It should be understood that any weighting on any parameter may be updated as described herein.

In examples where the feedback data suggests the parameter weighting change is merited, the process 1100 may include, at block 1110, updating the parameter weighting. Updating the parameter weighting may include updating a model and/or heuristics algorithm to utilize the updated parameter weighting instead of the prior parameter weighting for subsequent quality score determinations.

In examples where the feedback data does not suggest the parameter weighting change is merited, and/or following parameter weighting updates, the process 1100 may include, at block 1112, determining whether the feedback data suggests the addition of a new parameter to the quality score determination. For example, the feedback data and/or due diligence information may indicate information about the completed transactions and that information may be associated with a factor that is not currently used to influence the quality score determinations. By way of example, the factor may include identifying at least one of the intellectual property assets that is classified in a certain technology group, a specification length of the assets, a number of office actions received during prosecution, a period of time from filing of an application to issuance of a patent, etc. Determination of these new parameters may be based at least in part on machine learning modeling, as described more fully herein.

In examples where the feedback data suggests the addition of the new parameter, the process 1100 may include, at block 1114, including the new parameter in the quality score analysis. For example, when subsequent quality scores are determined, the new parameter may be scored, weighted, and utilized in generating the quality scores.

In examples where the feedback data does not suggest the addition of the new parameter, and/or following addition of the new parameter, the process 1100 may include, at block 1116, determining whether the feedback data suggests one or more financing limit threshold changes. For example, the financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million.

In examples where the feedback data suggests financing limit threshold changes should be implemented, the process 1100 may include, at block 1118, updating the financing limit thresholds. Updating the financing limit thresholds may include updating the models and/or heuristic algorithms utilized by the financing component to make financing amount determinations.

In examples where the feedback data does not suggest financing limit threshold changes, the process 1100 may include, at block 1120, maintaining parameters associated with determining the quality score. In this example, the feedback data may indicate that no changes to the parameter weighting, the parameters themselves, and/or the various thresholds is to be made. When this occurs, the completed transactions indicate that the processes described herein are working to accurately provide quality scores and/or financing indications, and thus no changes to the processes are merited.

FIG. 12 illustrates a flow diagram of an example process 1200 for training one or more machine learning models in association with intellectual property assessments. The order in which the operations or steps are described is not intended to be construed as a limitation, and any number of the described operations may be combined in any order and/or in parallel to implement process 1200. The operations described with respect to the process 1200 are described as being performed by a client device, and/or a system associated with the document analysis platform. However, it should be understood that some or all of these operations may be performed by some or all of components, devices, and/or systems described herein.

At block 1202, the process 1200 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 1204, the process 1200 may include collecting transaction data over a period of time. The transaction data may include information associated with completed transactions and/or information associated with requested financing transactions that were not accepted. This information may include factors that contributed to the transactions being completed and/or rejected as well as general information about the transactions, such as information related to the prosecution history of the assets in question, data associated with the assets themselves, quality scores and/or sub-scores, factor scores, etc.

At block 1206, the process 1200 may include generating a training dataset from the transaction data. Generation of the training dataset may include formatting the transaction data into input vectors for the machine learning model to intake, as well as associating the various data with the transaction outcomes.

At block 1208, the process 1200 may include generating one or more trained machine learning models utilizing the training dataset. Generation of the trained machine learning models may include updating parameters and/or weightings and/or thresholds utilized by the models to generate the quality scores and/or financing indications based at least in part on the data from the training dataset.

At block 1210, the process 1200 may include determining whether the trained machine learning models indicate improved performance metrics. For example, a testing group may be generated where the outcomes of the financing transactions are known but not to the trained machine learning models. The trained machine learning models may generate the quality scores and/or financing indications, which may be compared to the known results to determine whether the results of the trained machine learning model produce a superior result than the results of the machine learning model prior to training.

In examples where the trained machine learning models indicate improved performance metrics, the process 1200 may include, at block 1212, utilizing the trained machine learning models for generating subsequent results.

In examples where the trained machine learning models do not indicate improved performance metrics, the process 1200 may include, at block 1214, utilizing the previous iteration of the machine learning models for generating subsequent results.

FIG. 13 illustrates a flow diagram of an example process 1300 for causing applications residing on devices to automatically display content relevant to intellectual property assessments. The order in which the operations or steps are described is not intended to be construed as a limitation, and any number of the described operations may be combined in any order and/or in parallel to implement process 1300. The operations described with respect to the process 1300 are described as being performed by a client device, and/or a system associated with the document analysis platform. However, it should be understood that some or all of these operations may be performed by some or all of components, devices, and/or systems described herein.

At block 1302, the process 1300 may include causing a user interface to display forms for receiving user input. For example, the forms may include portions of the user interface configured to receive certain information associated with the financing transaction. For example, the information may include a requested financing amount, an indication of intellectual property assets to be used as collateral, revenue information, etc.

At block 1304, the process 1300 may include determining a quality score associated with the intellectual property assets. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0 or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1306, the process 1300 may include determining a qualifying financing amount and/or terms based at least in part on the quality score. For example, a financing component may be configured to associate a given quality score on the scale with a financing amount based at least in part on transaction data from completed transactions. For example, a transactions database may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline.

In addition to the above, the financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million. It should be understood that the financing thresholds may not necessarily be based on the greatest variance from the trendline for a completed transaction, but instead may be configured to capture a significant portion of the completed transactions.

At block 1308, the process 1300 may include determining whether the qualifying financing amount differs from the requested amount. For example, when the upper and lower-limit financing thresholds are determined, those thresholds may be utilized to determine a reasonableness of a request for financing. For example, a given financial transaction may be associated with a requested financing amount. The quality score for the intellectual property assets associated with the transaction may be determined and upper and lower-limit financing thresholds may be determined for that specific quality score. In examples where the requested financing amount is greater than the upper-limit financing threshold, an indication may be generated that the requested financing amount is too high and an indication of a more reasonable financing amount may be provided. In examples where the requested financing amount is less than the upper-limit financing threshold, an indication may be generated that the requested financing amount is appropriate. In examples where the requested financing amount is less than the lower-limit financing threshold, an indication of this determination may be generated and, in examples, a recommendation to increase the financing amount may be provided to at least the lower-limit financing threshold.

In examples where the qualifying financing amount differs from the requested amount, the process 1300 may include, at block 1310, causing an application on the client device to initiate and display a request to confirm financing at the qualifying financing amount instead of the requested amount. For example, given the time sensitive nature of financing transactions of the sort described herein, the system may, on the fly, determine that the financing amount information should be provided to the client device without delay. To do so, an application residing on the client device that is associated with the requested financing transaction may be caused to initiate. This may include the generation and transmission of a command from the analysis to the client device that, when received at the client device, causes the application to initiate without receiving user input data requesting initiation. This operation may be performed even when a given network connection is not established with the client device, such as when the device is offline from the internet. In these examples, the client device may be offline but may have established one or more short-range connections to other devices, such as via Bluetooth or similar protocols. In these examples, the analysis system may be configured to identify the related devices and send the application initiation command to one or more of those devices. Those devices may then use the short-range network to pass the command on to the client device to cause initiation of the application. The user interface, once displayed, may provide an indication of the qualifying financing amount and request user input confirming or rejecting the amount. If confirmed, user input data corresponding to this confirmation may be sent to the analysis system and may be utilized for proceeding with the transaction. If rejected, the operations associated with the financing transaction may cease without the need for further computational resource spend and/or due diligence time and/or expense.

In examples where the qualifying financing amount does not differ from the requested amount, the process 1300 may include, at block 1312, causing the application on the client device to initiate and display a maximum financing amount with functionality for proceeding with the transaction. Causing the application on the client device to initiate may be performed in the same or a similar manner as described with respect to block 1310, above.

FIG. 14 illustrates a flow diagram of an example process 1400 for determining reasonableness of financing amounts associated with intellectual property model parameter training. The order in which the operations or steps are described is not intended to be construed as a limitation, and any number of the described operations may be combined in any order and/or in parallel to implement process 1400. The operations described with respect to the process 1400 are described as being performed by a client device, and/or a system associated with the document analysis platform. However, it should be understood that some or all of these operations may be performed by some or all of components, devices, and/or systems described herein.

At block 1402, the process 1400 may include receiving, via a secure user interface, a request to procure financing for an entity. For example, forms of the secure user interface may include portions of the user interface configured to receive certain information associated with the financing transaction. For example, the information may include a requested financing amount, an indication of intellectual property assets to be used as collateral, revenue information, etc.

At block 1404, the process 1400 may include querying, based at least in part on receiving the request, a first dataset for first data representing intellectual property assets associated with the entity. For example, the first dataset may be from a database that includes intellectual property data on some or all intellectual property applications and/or registrations for one or more patent offices.

At block 1406, the process 1400 may include querying, based at least in part on receiving the request, a second dataset for second data representing business information associated with the entity. The business information may include any information associated with the business of the entity, such as, for example, revenue information, cost information, market identifiers, products, services, credit history, size, employee information, etc.

At block 1408, the process 1400 may include generating, utilizing the first data and the second data, a first quality score associated with the intellectual property assets, the quality score indicating: a degree of coverage associated with the intellectual property assets; a degree of opportunity for expanding coverage of the intellectual property assets; and a degree of exposure associated with the intellectual property assets. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0) or near 0), if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1410, the process 1400 may include querying a third dataset for third data representing completed transactions to procure financing for other entities, the third dataset indicating: financing amounts for the completed transactions; and quality scores associated with the completed transactions. For example, a transaction database may be queried for financing amounts associated with those completed transactions as well as quality scores associated with the entities and intellectual property portfolios associated with those completed transactions.

At block 1412, the process 1400 may include determining an upper-limit financing threshold based at least in part on the third data, the upper-limit financing threshold indicating upper-limit financing amounts across quality scores. For example, a financing component of the analysis system may be configured to receive the quality scores as generated herein and to utilize those quality scores to determine a financing amount to associate with a financial transaction and/or to determine a reasonableness of a requested financing amount for the financial transaction. To start, the quality scores described herein may be associated with a scale, such as from 0 to 100, with 0 being a lowest possible quality score and 100 being a highest quality score. It should be understood that other scales and scores may also be utilized and the 0-to-100 scale described herein is provided by way of example. The financing component may be configured to associate a given quality score on the scale with a financing amount based at least in part on transaction data from completed transactions. For example, a transactions database may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline.

In addition to the above, the financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million. It should be understood that the financing thresholds may not necessarily be based on the greatest variance from the trendline for a completed transaction, but instead may be configured to capture a significant portion of the completed transactions.

At block 1414, the process 1400 may include determining a lower-limit financing threshold based at least in part on the third data, the lower-limit financing threshold indicating lower-limit financing amounts across quality scores. Determining the lower-limit financing threshold may be performed in the same or a similar manner as described above with respect to block 1412.

At block 1416, the process 1400 may include determining, utilizing the first quality score associated with the intellectual property assets and based at least in part on the upper-limit financing threshold, an upper-limit financing amount to associate with the intellectual property assets. For example, when the upper and lower-limit financing thresholds are determined, those thresholds may be utilized to determine a reasonableness of a request for financing. For example, a given financial transaction may be associated with a requested financing amount. The quality score for the intellectual property assets associated with the transaction may be determined and upper and lower-limit financing thresholds may be determined for that specific quality score. In examples where the requested financing amount is greater than the upper-limit financing threshold, an indication may be generated that the requested financing amount is too high and an indication of a more reasonable financing amount may be provided. In examples where the requested financing amount is less than the upper-limit financing threshold, an indication may be generated that the requested financing amount is appropriate. In examples where the requested financing amount is less than the lower-limit financing threshold, an indication of this determination may be generated and, in examples, a recommendation to increase the financing amount may be provided to at least the lower-limit financing threshold.

At block 1418, the process 1400 may include determining, utilizing the first quality score associated with the intellectual property assets and based at least in part on the lower-limit financing threshold, a lower-limit financing amount to associate with the intellectual property assets. The lower-limit financing amount may be determined in the same or a similar manner as described with respect to the operations of block 1416.

Additionally, or alternatively, the process 1400 may include determining a first weighting parameter to apply to the degree of coverage, the degree of coverage indicating at least a quantity of the intellectual property assets, a breadth of the intellectual property assets, and a market alignment of the intellectual property assets to at least one market associated with the entity. The process 1400 may also include determining a second weighting parameter to apply to the degree of opportunity, the degree of opportunity indicating at least a number of intellectual property applications associated with the entity, a first intellectual property application filing velocity associated with the entity, and a second intellectual property application filing velocity associated with entities in the market. The process 1400 may also include determining a third weighting parameter to apply to the degree of exposure, the degree of exposure indicating at least an intellectual property validity probability and litigation metrics associated with the intellectual property assets. The process 1400 may also include generating a model configured to determine quality scores utilizing the first weighting parameter, the second weighting parameter, and the third weighting parameter. In these examples, generating the first quality score may be performed utilizing the model.

Additionally, or alternatively, the process 1400 may include establishing a scale of quality scores, the scale indicating a minimum possible quality score and a maximum possible quality score. The process 1400 may also include, for individual ones of the completed transactions, associating the quality scores with the scale. The process 1400 may also include determining maximum financing amounts provided in the completed transactions for individual ones of the quality scores. The process 1400 may also include extrapolating the maximum financing amounts across various quality scores on the scale. The process 1400 may also include determining minimum financing amounts provided in the completed transactions for individual ones of the quality scores. The process 1400 may also include extrapolating the minimum financing amounts across the various quality scores on the scale. In these examples: determining the upper-limit financing threshold may be based at least in part on extrapolating the maximum financing amounts across the various quality scores on the scale; and determining the lower-limit financing threshold may be based at least in part on extrapolating the minimum financing amounts across the various quality scores on the scale.

Additionally, or alternatively, the process 1400 may include determining an intellectual property portfolio size associated with individual ones of the completed transactions. The process 1400 may also include determining a variance from a given financing amount associated with the individual ones of the completed transactions based at least in part on the intellectual property portfolio size. In these examples: determining the upper-limit financing threshold may be based at least in part on the variance; and determining the lower-limit financing threshold may be based at least in part on the variance.

FIG. 15 illustrates a flow diagram of another example process 1500 for determining reasonableness of financing amounts associated with intellectual property model parameter training. The order in which the operations or steps are described is not intended to be construed as a limitation, and any number of the described operations may be combined in any order and/or in parallel to implement process 1500. The operations described with respect to the process 1500 are described as being performed by a client device, and/or a system associated with the document analysis platform. However, it should be understood that some or all of these operations may be performed by some or all of components, devices, and/or systems described herein.

At block 1502, the process 1500 may include receiving first data representing intellectual property assets associated with an entity. For example, the first dataset may be from a database that includes intellectual property data on some or all intellectual property applications and/or registrations for one or more patent offices.

At block 1504, the process 1500 may include receiving second data representing business information associated with the entity. The business information may include any information associated with the business of the entity, such as, for example, revenue information, cost information, market identifiers, products, services, credit history, size, employee information, etc.

At block 1506, the process 1500 may include generating, utilizing the first data and the second data, a first quality score associated with the intellectual property assets, the quality score indicating: a degree of coverage associated with the intellectual property assets: a degree of opportunity for expanding coverage of the intellectual property assets; and a degree of exposure associated with the intellectual property assets. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0 or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below: In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1508, the process 1500 may include identifying third data representing completed transactions for other entities, the third data indicating: financing amounts for the completed transactions; and quality scores associated with the completed transactions. For example, a transaction database may be queried for financing amounts associated with those completed transactions as well as quality scores associated with the entities and intellectual property portfolios associated with those completed transactions.

At block 1510, the process 1500 may include determining an upper-limit financing threshold based at least in part on the third data. For example, a financing component of the analysis system may be configured to receive the quality scores as generated herein and to utilize those quality scores to determine a financing amount to associate with a financial transaction and/or to determine a reasonableness of a requested financing amount for the financial transaction. To start, the quality scores described herein may be associated with a scale, such as from 0 to 100, with 0 being a lowest possible quality score and 100 being a highest quality score. It should be understood that other scales and scores may also be utilized and the 0-to-100 scale described herein is provided by way of example. The financing component may be configured to associate a given quality score on the scale with a financing amount based at least in part on transaction data from completed transactions. For example, a transactions database may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline.

In addition to the above, the financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million. It should be understood that the financing thresholds may not necessarily be based on the greatest variance from the trendline for a completed transaction, but instead may be configured to capture a significant portion of the completed transactions.

At block 1512, the process 1500 may include determining a lower-limit financing threshold based at least in part on the third data. Determining the lower-limit financing threshold may be performed in the same or a similar manner as described above with respect to block 1510.

At block 1514, the process 1500 may include determining, utilizing the first quality score and based at least in part on the upper-limit financing threshold and the lower-financing threshold, a financing amount to associate with the intellectual property assets. For example, when the upper and lower-limit financing thresholds are determined, those thresholds may be utilized to determine a reasonableness of a request for financing. For example, a given financial transaction may be associated with a requested financing amount. The quality score for the intellectual property assets associated with the transaction may be determined and upper and lower-limit financing thresholds may be determined for that specific quality score. In examples where the requested financing amount is greater than the upper-limit financing threshold, an indication may be generated that the requested financing amount is too high and an indication of a more reasonable financing amount may be provided. In examples where the requested financing amount is less than the upper-limit financing threshold, an indication may be generated that the requested financing amount is appropriate. In examples where the requested financing amount is less than the lower-limit financing threshold, an indication of this determination may be generated and, in examples, a recommendation to increase the financing amount may be provided to at least the lower-limit financing threshold.

Additionally, or alternatively, the process 1500 may include determining a first weighting parameter to apply to the degree of coverage, determining a second weighting parameter to apply to the degree of opportunity, and determining a third weighting parameter to apply to the degree of exposure, the first weighting parameter differing from the second weighting parameter and the third weighting parameter, the second weighting parameter differing from the third weighting parameter. The process 1500 may also include generating a model configured to determine quality scores utilizing the first weighting parameter, the second weighting parameter, and the third weighting parameter. In these examples, generating the first quality score may be performed utilizing the model.

Additionally, or alternatively, the process 1500 may include determining maximum financing amounts provided in the completed transactions. The process 1500 may also include extrapolating the maximum financing amounts across various quality scores on a scale. The process 1500 may also include determining minimum financing amounts provided in the completed transactions. The process 1500 may also include extrapolating the minimum financing amounts across the various quality scores on the scale. In these examples: determining the upper-limit financing threshold may be based at least in part on extrapolating the maximum financing amounts; and determining the lower-limit financing threshold may be based at least in part on extrapolating the minimum financing amounts.

Additionally, or alternatively, the process 1500 may include determining an intellectual property portfolio size associated with individual ones of the completed transactions. The process 1500 may also include determining a variance from a given financing amount associated with the individual ones of the completed transactions based at least in part on the intellectual property portfolio size. In these examples, determining at least one of the upper-limit financing threshold or the lower-limit financing threshold may be based at least in part on the variance.

Additionally, or alternatively, the process 1500 may include receiving a request to procure financing for the entity, the request indicating a requested financing amount. The process 1500 may also include determining that the requested financing amount is greater than the upper-limit financing threshold. The process 1500 may also include generating a user interface configured to indicate: that the requested financing amount is greater than the upper-limit financing threshold; and the finance amount that satisfies the upper-limit financing threshold.

Additionally, or alternatively, the process 1500 may include generating a machine learning model configured to generate quality scores. The process 1500 may also include generating a training dataset that includes at least a portion of the third data. The process 1500 may also include training the machine learning model utilizing the training dataset such that a trained machine learning model is generated. In these examples, generating the first quality score may include utilizing the trained machine learning model to generate the first quality score.

Additionally, or alternatively, the process 1500 may include determining a financing median based at least in part on the upper-limit financing threshold and the lower-limit financing threshold. In these examples, determining the financing amount may include determining the financing amount from the financing median associated with the first quality score.

Additionally, or alternatively, the process 1500 may include parsing a first dataset for the first data utilizing an entity identifier associated with the entity. The process 1500 may also include parsing a second dataset for the second data utilizing the entity identifier. The process 1500 may also include parsing a third dataset for the third data utilizing a requested financing amount specified by the entity.

FIG. 16 illustrates a flow diagram of an example process 1600 for determining insurability of a financing associated with intellectual property assets utilizing model parameter training. The order in which the operations or steps are described is not intended to be construed as a limitation, and any number of the described operations may be combined in any order and/or in parallel to implement process 1600. The operations described with respect to the process 1600 are described as being performed by a client device, and/or a system associated with the document analysis platform. However, it should be understood that some or all of these operations may be performed by some or all of components, devices, and/or systems described herein.

At block 1602, the process 1600 may include receiving, via a secure user interface, a request to insure a financing transaction with intellectual property assets as collateral if default on the financing transaction occurs. For example, an entity may also desire to participate in a financing transaction and to utilize the intellectual property assets in association with the financing transaction. Example financing transactions may include acquiring a loan, asset transfers, etc. In these examples, the intellectual property assets may be utilized as collateral against default. In the loan example, a lender may lend a financing amount to the entity and may hold the intellectual property as collateral against default on the loan. The loan may also be insured by an insurer. In the event of default, the lender may make a claim to the insurer, and the insurer may pay on that claim assuming that the claim is meritorious. The insurer and/or the lender, depending on the terms of the arrangement, may acquire title to the intellectual property assets based on the default and/or may assert a right to sell those intellectual property assets in an attempt to recuperate some or all of the unpaid loan amount.

At block 1604, the process 1600 may include querying, based at least in part on receiving the request, a first dataset for first data representing the intellectual property assets. For example, the first dataset may be from a database that includes intellectual property data on some or all intellectual property applications and/or registrations for one or more patent offices.

At block 1606, the process 1600 may include querying, based at least in part on receiving the request, a second dataset for second data representing business information of an entity associated with the intellectual property assets. The business information may include any information associated with the business of the entity, such as, for example, revenue information, cost information, market identifiers, products, services, credit history, size, employee information, etc.

At block 1608, the process 1600 may include generating, utilizing the first data and the second data, a first quality score associated with the intellectual property assets, the quality score indicating: a degree of coverage associated with the intellectual property assets: a degree of opportunity for expanding coverage of the intellectual property assets; and a degree of exposure associated with the intellectual property assets. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0) or near 0), if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1610, the process 1600 may include querying a third dataset for third data representing completed financial transactions, the third dataset indicating quality scores associated with the completed financial transactions. For example, a transaction database may be queried for financing amounts associated with those completed transactions as well as quality scores associated with the entities and intellectual property portfolios associated with those completed transactions.

At block 1612, the process 1600 may include determining, utilizing the third data, a threshold quality score for insuring financing transactions. For example, a financing component of the analysis system may be configured to receive the quality scores as generated herein and to utilize those quality scores to determine a financing amount to associate with a financial transaction and/or to determine a reasonableness of a requested financing amount for the financial transaction. To start, the quality scores described herein may be associated with a scale, such as from 0 to 100, with 0 being a lowest possible quality score and 100 being a highest quality score. It should be understood that other scales and scores may also be utilized and the 0-to-100 scale described herein is provided by way of example. The financing component may be configured to associate a given quality score on the scale with a financing amount based at least in part on transaction data from completed transactions. For example, a transactions database may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline. In this example, the threshold quality score may be based at least on the requested financing amount. For example, the trendline may be utilized to determine a reference quality score associated with the requested financing amount. The reference quality score, or a range associated with the reference quality score, may correspond to the quality score threshold.

At block 1614, the process 1600 may include determining that the first quality score satisfies the threshold quality score. For example, a comparison of the first quality score to the threshold quality score may be performed, and when the first quality score is at least equal to the threshold quality score, the first quality score may satisfy the threshold quality score.

At block 1616, the process 1600 may include generating, based at least in part on the first quality score satisfying the threshold quality score, a user interface configured to present an indication that the quality of the intellectual property assets is sufficient for insuring the financial transaction. For example, a command may be sent to the client device that causes an application on the client device to initiate and display the user interface.

Additionally, or alternatively, the process 1600 may include receiving a requested financing amount associated with the request. The process 1600 may also include determining, from the third data, a financing amount range associated with the completed financial transactions having quality scores within a threshold range of the first quality score. The process 1600 may also include determining that the requested financing amount is within the financing amount range. In these examples, the user interface may be configured to present an indication that the requested financing amount is within the financing amount range.

Additionally, or alternatively, the process 1600 may include determining, based at least in part on the business information, a credit review score associated with the entity. The process 1600 may also include correlating the credit review score with the first quality score of the intellectual property assets. In these examples, the user interface may be configured to present a recommendation regarding a level of review of the request based at least in part on a correlation of the credit review score to the first quality score.

FIG. 17 illustrates a flow diagram of another example process 1700 for determining insurability of a financing associated with intellectual property assets utilizing model parameter training. The order in which the operations or steps are described is not intended to be construed as a limitation, and any number of the described operations may be combined in any order and/or in parallel to implement process 1700. The operations described with respect to the process 1700 are described as being performed by a client device, and/or a system associated with the document analysis platform. However, it should be understood that some or all of these operations may be performed by some or all of components, devices, and/or systems described herein.

At block 1702, the process 1700 may include receiving a request to insure a financing transaction associated with intellectual property assets of an entity. For example, an entity may also desire to participate in a financing transaction and to utilize the intellectual property assets in association with the financing transaction. Example financing transactions may include acquiring a loan, asset transfers, etc. In these examples, the intellectual property assets may be utilized as collateral against default. In the loan example, a lender may lend a financing amount to the entity and may hold the intellectual property as collateral against default on the loan. The loan may also be insured by an insurer. In the event of default, the lender may make a claim to the insurer, and the insurer may pay on that claim assuming that the claim is meritorious. The insurer and/or the lender, depending on the terms of the arrangement, may acquire title to the intellectual property assets based on the default and/or may assert a right to sell those intellectual property assets in an attempt to recuperate some or all of the unpaid loan amount.

At block 1704, the process 1700 may include receiving first data representing the intellectual property assets. For example, the first dataset may be from a database that includes intellectual property data on some or all intellectual property applications and/or registrations for one or more patent offices.

At block 1706, the process 1700 may include receiving second data representing business information associated with the entity. The business information may include any information associated with the business of the entity, such as, for example, revenue information, cost information, market identifiers, products, services, credit history, size, employee information, etc.

At block 1708, the process 1700 may include generating, utilizing the first data and the second data, a first quality score associated with the intellectual property assets, the first quality score indicating: a degree of coverage associated with the intellectual property assets: a degree of opportunity for expanding coverage of the intellectual property assets; and a degree of exposure associated with the intellectual property assets. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0 or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1710, the process 1700 may include receiving third data representing completed financial transactions, the third data indicating quality scores associated with the completed financial transactions. For example, a transaction database may be queried for financing amounts associated with those completed transactions as well as quality scores associated with the entities and intellectual property portfolios associated with those completed transactions.

At block 1712, the process 1700 may include determining, utilizing the third data, a threshold quality score. For example, a financing component of the analysis system may be configured to receive the quality scores as generated herein and to utilize those quality scores to determine a financing amount to associate with a financial transaction and/or to determine a reasonableness of a requested financing amount for the financial transaction. To start, the quality scores described herein may be associated with a scale, such as from 0 to 100, with 0 being a lowest possible quality score and 100 being a highest quality score. It should be understood that other scales and scores may also be utilized and the 0-to-100 scale described herein is provided by way of example. The financing component may be configured to associate a given quality score on the scale with a financing amount based at least in part on transaction data from completed transactions. For example, a transactions database may be queried for financing amounts associated with those completed transactions as well as quality scores associated with the entities and intellectual property portfolios associated with those completed transactions. An average and/or other representation of the financing amounts attributable to the various quality scores for the completed transactions may be determined and a trendline may be determined. The trendline may indicate a financing amount associated with a given quality score on the scale. For example, the trendline may be linear and may indicate that a quality score of 50 indicates a reasonable financing amount of approximately $20 million, while a quality score of 70 indicates a reasonable financing amount of approximately $60 million and a quality score of 90 indicates a reasonable financing amount of approximately $90 million. While the trendline described here is linear, it should be understood that the trendline may not be linear. Utilizing the trendline described herein, a financing amount to attribute to a given financial transaction may be determined by mapping the quality score determined for the financial transaction to the amount indicated by the trendline. In this example, the threshold quality score may be based at least on the requested financing amount. For example, the trendline may be utilized to determine a reference quality score associated with the requested financing amount. The reference quality score, or a range associated with the reference quality score, may correspond to the quality score threshold.

At block 1714, the process 1700 may include determining that the first quality score satisfies the threshold quality score. For example, a comparison of the first quality score to the threshold quality score may be performed, and when the first quality score is at least equal to the threshold quality score, the first quality score may satisfy the threshold quality score.

At block 1716, the process 1700 may include generating, based at least in part on the first quality score satisfying the threshold quality score, an indication that the quality of the intellectual property assets is sufficient for insuring the financial transaction. For example, a command may be sent to the client device that causes an application on the client device to initiate and display the user interface.

Additionally, or alternatively, the process 1700 may include receiving a requested financing amount associated with the request. The process 1700 may also include determining, from the third data, a financing amount range associated with a subset of the completed financial transactions having quality scores within a threshold range of the first quality score. The process 1700 may also include determining that the requested financing amount is within the financing amount range. The process 1700 may also include generating an indication that the requested financing amount is within the financing amount range.

Additionally, or alternatively, the process 1700 may include determining, based at least in part on the business information, a credit review score associated with the entity. The process 1700 may also include correlating the credit review score with the first quality score of the intellectual property assets. The process 1700 may also include generating a recommendation regarding a level of review of the request based at least in part on a correlation of the credit review score to the first quality score.

Additionally, or alternatively, the process 1700 may include determining, from the first data and the second data, a first sub-score indicating at least a quantity of the intellectual property assets, a breadth of the intellectual property assets, and a market alignment of the intellectual property assets to at least one market associated with the entity. The process 1700 may also include determining, from the first data, a second sub-score indicating at least a number of intellectual property applications associated with the entity, a first intellectual property application filing velocity associated with the entity, and a second intellectual property application filing velocity associated with entities in the market. The process 1700 may also include determining, from the first data and the second data, a third sub-score indicating at least an intellectual property validity probability and litigation metrics associated with the intellectual property assets. In these examples, generating the first quality score may be based at least in part on the first sub-score, the second sub-score, and the third sub-score.

Additionally, or alternatively, the process 1700 may include determining a second quality score threshold that indicates a higher quality than the first quality score threshold. The process 1700 may also include determining that the first quality score satisfies the second quality score threshold. The process 1700 may also include generating a recommended level of diligence to be performed based at least in part on the first quality score satisfying the second quality score threshold, the recommended level of diligence indicating less diligence is needed than if the first quality score did not satisfy the second quality score threshold.

Additionally, or alternatively, the process 1700 may include determining, from the third data, a financing amount range associated with a subset of the completed financial transactions having quality scores within a threshold range of the first quality score. The process 1700 may also include determining that a requested financing amount associated with the request is less than the financing amount range. The process 1700 may also include generating a recommendation to increase the financing amount for the financing transaction based at least in part on the requested financing amount being less than the financing amount range.

Additionally, or alternatively, the process 1700 may include determining, based at least in part on the business information, a credit review score associated with the entity. The process 1700 may also include generating a matrix that correlates the credit review score with the first quality score, the matrix indicating: first correlations associated with a recommendation to reject financing transaction requests: second correlations associated with a recommendation to proceed with financing transaction requests; and third correlations associated with financing transactions unelected for funding. The process 1700 may also include determining, utilizing the matrix, that a correlation of the credit review score and the first quality score is associated with the second correlations.

Additionally, or alternatively, the process 1700 may include generating a machine learning model configured to correlate quality scores with the completed financial transactions. The process 1700 may also include generating a training dataset that includes at least a portion of the third data. The process 1700 may also include training the machine learning model utilizing the training dataset such that a trained machine learning model is generated. In these examples, determining the threshold quality score may include utilizing the trained machine learning model.

FIG. 18 illustrates a flow diagram of an example process 1800 for generating intellectual property quality scores utilizing a feedback loop. The order in which the operations or steps are described is not intended to be construed as a limitation, and any number of the described operations may be combined in any order and/or in parallel to implement process 1800. The operations described with respect to the process 1800 are described as being performed by a client device, and/or a system associated with the document analysis platform. However, it should be understood that some or all of these operations may be performed by some or all of components, devices, and/or systems described herein.

At block 1802, the process 1800 may include generating, utilizing a model having parameters configured to assess attributes of intellectual property data, quality scores associated with multiple entities, individual ones of the quality scores indicating: a degree of coverage associated with intellectual property assets of the multiple entities: a degree of opportunity for expanding coverage of the intellectual property assets of the multiple entities; and a degree of exposure associated with the intellectual property assets of the multiple entities. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0 or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1804, the process 1800 may include storing first data representing the quality scores for the multiple entities along with indicators of the intellectual property assets of the multiple entities. For example, a transaction database may be queried for financing amounts associated with those completed transactions as well as quality scores associated with the entities and intellectual property portfolios associated with those completed transactions.

At block 1806, the process 1800 may include receiving feedback data indicating outcomes of transactions associated with the intellectual property assets of the multiple entities. For example, the feedback data may include indications of the dispositions of transactions where a quality score was provided. The dispositions may include that transactions being completed, a financing amount associated with the completed transaction, the transactions being rejected, due diligence levels associated with the transactions, etc. This feedback data may be utilized to update one or more of the processes described herein for determining the quality score, the financing values, insurability determinations, due diligence determinations, credit review scores, etc. Due diligence data may indicate, for a given financing transaction, whether positive or negative indications of asset quality and/or entity insurability were determined along with other information associated with the intellectual property assets. The other information include details on a valuation of the assets, additional details on litigation-related events associated with the assets, identification of potential licensees for the assets, validity concerns associated with the assets, estoppel information, assignee issues associated with the assets, etc.

At block 1808, the process 1800 may include generating an updated model that includes updates to at least one of the parameters based at least in part on the feedback data. For example, as described above, the quality score may be determined from several sub-scores as well as factors and weightings associated with the sub-scores. Each of these factors (described here as parameters, such as modeling parameters) may be associated with its own weighting. The feedback data and indicate that one or more of these weightings should be changed. For example, a first weighting associated with patent application filing velocity may be initially set for that factor. The feedback data may indicate that completed transactions with certain filing velocities are accepted at a high rate and/or are associated with higher financing amounts. In this example, the weighting for the filing velocity parameter may be updated such that the factor is more important to the overall quality score. It should be understood that any weighting on any parameter may be updated as described herein.

Additionally, or alternatively, the feedback data and/or due diligence information may indicate information about the completed transactions and that information may be associated with a factor that is not currently used to influence the quality score determinations. By way of example, the factor may include identifying at least one of the intellectual property assets that is classified in a certain technology group, a specification length of the assets, a number of office actions received during prosecution, a period of time from filing of an application to issuance of a patent, etc. Determination of these new parameters may be based at least in part on machine learning modeling, as described more fully herein.

Additionally, or alternatively, the financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million.

In examples where the feedback data suggests financing limit threshold changes should be implemented, the process 1800 may include updating the financing limit thresholds. Updating the financing limit thresholds may include updating the models and/or heuristic algorithms utilized by the financing component to make financing amount determinations.

At block 1810, the process 1800 may include receiving, via a secure user interface, a request to evaluate intellectual property assets associated with an entity. The request may be in association with a financing transaction and/or may be divorced from a financing transaction and instead may be informational in nature and/or for the purpose of evaluating the intellectual property assets for reasons other than a financing transaction.

At block 1812, the process 1800 may include generating a first quality score for the intellectual property assets of the entity utilizing the updated model. For example, instead of utilizing the original model, the updated model may be utilized to generate quality scores.

Additionally, or alternatively, the process 1800 may include determining a first weighting value to apply to first parameters associated with the degree of coverage, the first parameters indicating at least a quantity of the intellectual property assets, a breadth of the intellectual property assets, and a market alignment of the intellectual property assets to at least one market associated with the entity. The process 1800 may also include determining a second weighting value to apply to second parameters associated with the degree of opportunity, the first parameters indicating at least a number of intellectual property applications associated with the entity, a first intellectual property application filing velocity associated with the entity, and a second intellectual property application filing velocity associated with entities in the market. The process 1800 may also include determining a third weighting value to apply to third parameters associated with the degree of exposure, the third parameters indicating at least an intellectual property validity probability and litigation metrics associated with the intellectual property assets. The process 1800 may also include, based at least in part on the feedback data, adjusting the first weighting value, the second weighting value, and the third weighting value. In these examples, generating the updated model may be based at least in part on adjusting the weighting value, the second weighting value, and the third weighting value.

Additionally, or alternatively, the process 1800 may include determining, based at least in part on the feedback data, additional parameters to associate with the model. In these examples, generating the updated model may comprise including the additional parameters with the parameters for determining the quality scores.

Additionally, or alternatively, the process 1800 may include storing market segment data indicating attributes of market segments. The process 1800 may also include determining, utilizing the market segment data, a market segment of the market segments that is associated with the intellectual property assets of the entity. The process 1800 may also include determining reference intellectual property assets associated with the market segment, the reference intellectual property assets being associated with entities other than the entity. The process 1800 may also include determining quality scores of the reference intellectual property assets. The process 1800 may also include generating, utilizing the first quality score of the intellectual property assets of the entity and the quality scores of the reference intellectual property assets, a ranking of the entity and the entities other than the entity.

FIG. 19 illustrates a flow diagram of another example process 1900 for generating intellectual property quality scores utilizing a feedback loop. The order in which the operations or steps are described is not intended to be construed as a limitation, and any number of the described operations may be combined in any order and/or in parallel to implement process 1900. The operations described with respect to the process 1900 are described as being performed by a client device, and/or a system associated with the document analysis platform. However, it should be understood that some or all of these operations may be performed by some or all of components, devices, and/or systems described herein.

At block 1902, the process 1900 may include generating, utilizing parameters configured to assess attributes of intellectual property data, quality scores associated with multiple entities, individual ones of the quality scores indicating: a degree of coverage associated with intellectual property assets of the multiple entities: a degree of opportunity for expanding coverage of the intellectual property assets of the multiple entities; and a degree of exposure associated with the intellectual property assets of the multiple entities. For example, once intellectual property data and business information is acquired, a scoring component may utilize this data to determine a quality score to associate with the entity and the intellectual property assets of the entity. The quality score may have multiple sub-scores, such as a sub-score associated with a degree of coverage of the intellectual property assets, a sub-score associated with a degree of opportunity to expand coverage of the intellectual property assets, and/or a sub-score associated with a degree of exposure associated with the entity and/or the intellectual property assets. Each of these sub-scores may be determined based at least in part on one or more factors. For example, factors that may impact the degree of coverage may include a number of issued intellectual property assets, a number of issued intellectual property assets in a primary jurisdiction (such as the country in which the lender and/or borrower operate), a degree of market alignment between the market of the entity and the intellectual property assets, a breadth of the intellectual property assets, and/or one or more other factors that may impact the degree of coverage. Additionally, factors that may impact the degree of opportunity may include a number of pending intellectual property applications, a number of pending intellectual property applications in the primary jurisdiction, filing velocity values, market identifiers of the markets where the entity's products and/or services are sold, and/or any other factor that may impact the degree of opportunity. Furthermore, factors that may impact the degree of exposure may include a probability that the intellectual property assets are valid, assignee information associated with the intellectual property assets, a total number of cases associated with the entity as a named plaintiff or defendant, a number of cases associated with similar entities, and/or any other factor that may impact the degree of exposure.

For some or all of these factors, the analysis system may determine a score, a weighting to assign to the score, and a resulting weighted score. In examples, the score of each of the factors may be provided on a scale, such as a scale from 0 to 1. The analysis system may be configured to determine values associated with the factors (e.g., determine a number of issued patents) and apply one or more models and/or heuristics to determine how to score that factor. For example, when models are utilized, the models may be trained to determine that if the number of issued patents is less than a threshold number, the score should be 0 or near 0, if the number of issued patents satisfies the threshold number but does not satisfy another higher threshold number, the score should be 0.5 or near 0.5, and if the number of issued patents satisfies the higher threshold, the score should be 1 or near 1. The thresholds and/or other benchmarks for any given factor may be determined by model training and/or heuristics updates based on completed transaction data and/or other types of feedback data, which will be described in more detail below. In addition to the factor scoring, the weighting may also be influenced by the models and/or heuristics as trained. Sticking with the example of the number of issued patents, the weighting may be provided on a scale, such as from 0.1 to 2.0. That weighting may be applied to the factor score to generate the weighted score. For example, if a factor score is 0.5 and the weighting for that factor is 0.5, the weighted score may be 0.25. Again, the weightings for any given factor may be determined by model training and/or heuristics updates based on completed transaction data and/or other types of feedback data.

Additionally, each of the sub-scores (i.e., the sub-score for degree of coverage, the sub-score for degree of exposure, and the sub-score for the degree of exposure) may be weighted and/or may encompass a value that differs from other sub-scores. For example, the overall quality score may be associated with a scale, such as from 0 to 100. Based at least in part on the completed transaction data and/or other types of feedback data, each of the sub-scores may represent a portion of the overall scale. By way of example, in certain examples the degree of coverage may be weighted more than the other sub-scores. In other examples, the degree of exposure and/or the degree of opportunity may be weighted more than the other sub-scores. Based at least in part on some or all of the analysis described herein, quality scores may be generated and utilized in one or more ways.

At block 1904, the process 1900 may include receiving feedback data indicating outcomes of transactions associated with the intellectual property assets of the multiple entities. For example, the feedback data may include indications of the dispositions of transactions where a quality score was provided. The dispositions may include that transactions being completed, a financing amount associated with the completed transaction, the transactions being rejected, due diligence levels associated with the transactions, etc. This feedback data may be utilized to update one or more of the processes described herein for determining the quality score, the financing values, insurability determinations, due diligence determinations, credit review scores, etc. Due diligence data may indicate, for a given financing transaction, whether positive or negative indications of asset quality and/or entity insurability were determined along with other information associated with the intellectual property assets. The other information include details on a valuation of the assets, additional details on litigation-related events associated with the assets, identification of potential licensees for the assets, validity concerns associated with the assets, estoppel information, assignee issues associated with the assets, etc.

At block 1906, the process 1900 may include generating updated parameters based at least in part on the feedback data. For example, as described above, the quality score may be determined from several sub-scores as well as factors and weightings associated with the sub-scores. Each of these factors (described here as parameters, such as modeling parameters) may be associated with its own weighting. The feedback data and indicate that one or more of these weightings should be changed. For example, a first weighting associated with patent application filing velocity may be initially set for that factor. The feedback data may indicate that completed transactions with certain filing velocities are accepted at a high rate and/or are associated with higher financing amounts. In this example, the weighting for the filing velocity parameter may be updated such that the factor is more important to the overall quality score. It should be understood that any weighting on any parameter may be updated as described herein.

Additionally, or alternatively, the feedback data and/or due diligence information may indicate information about the completed transactions and that information may be associated with a factor that is not currently used to influence the quality score determinations. By way of example, the factor may include identifying at least one of the intellectual property assets that is classified in a certain technology group, a specification length of the assets, a number of office actions received during prosecution, a period of time from filing of an application to issuance of a patent, etc. Determination of these new parameters may be based at least in part on machine learning modeling, as described more fully herein.

Additionally, or alternatively, the financing component may be configured to determine an upper-limit financing threshold and a lower-limit financing threshold associated with given quality scores. For example, a variance from the trendline may be determined, such as +/−$20 million. Determining the variance may be based at least in part on analysis of the transaction data from the completed transactions. For example, the transaction data may indicate completed transactions with financing amounts that are higher and lower than the exact amount indicated by the trendline. However, the financing component may determine a degree of variance from the trendline for the completed transactions to determine what the upper and lower-limit financing thresholds should be. For example, a given set of completed transactions may indicate that 10 transactions were completed with financing amounts above the trendline and 10 transaction were completed with financing amount below the trendline. Of the 10 transactions above the trendline and the 10 transactions below the trendline, the difference between the financing amount and the amount indicated by the trendline may be determined. In situations where the degree of variance of the 20 transactions is relatively small, such as typically between $1 million and $5 million difference, the upper and lower-limit financing thresholds may be set to, say, $5 million from the trendline. When the degree of variance is higher, such as between $1 million and $20 million, the upper and lower-limit financing thresholds may be set to, say, $20 million.

In examples where the feedback data suggests financing limit threshold changes should be implemented, the process 1900 may include updating the financing limit thresholds. Updating the financing limit thresholds may include updating the models and/or heuristic algorithms utilized by the financing component to make financing amount determinations.

At block 1908, the process 1900 may include receiving a request to evaluate intellectual property assets associated with an entity. The request may be in association with a financing transaction and/or may be divorced from a financing transaction and instead may be informational in nature and/or for the purpose of evaluating the intellectual property assets for reasons other than a financing transaction.

At block 1910, the process 1900 may include generating a first quality score for the intellectual property assets of the entity utilizing the updated parameters. For example, instead of utilizing the original model, the updated model may be utilized to generate quality scores.

Additionally, or alternatively, the process 1900 may include determining a first weighting value to apply to a first subset of the parameters associated with the degree of coverage. The process 1900 may also include determining a second weighting value to apply to a second subset of the parameters associated with the degree of opportunity. The process 1900 may also include determining a third weighting value to apply to a third subset of the parameters associated with the degree of exposure. The process 1900 may also include, based at least in part on the feedback data, adjusting the first weighting value, the second weighting value, and the third weighting value. In these examples, generating the updated parameters may be based at least in part on adjusting the weighting value, the second weighting value, and the third weighting value.

Additionally, or alternatively, the process 1900 may include determining, based at least in part on the feedback data, an additional parameter to associate with the parameters. In these examples, generating the updated parameters may comprise including the additional parameter with the parameters for determining the quality scores.

Additionally, or alternatively, the process 1900 may include determining, utilizing market segment data indicating attributes of market segments, a market segment of the market segments that is associated with the intellectual property assets of the entity. The process 1900 may also include determining reference intellectual property assets associated with the market segment, the reference intellectual property assets being associated with entities other than the entity. The process 1900 may also include determine quality scores of the reference intellectual property assets. The process 1900 may also include generating, utilizing the first quality score of the intellectual property assets of the entity and the quality scores of the reference intellectual property assets, a ranking of the entity and the entities other than the entity.

Additionally, or alternatively, the process 1900 may include determining a technology category associated with the intellectual property assets of the entity. The process 1900 may also include determining one or more other entities with intellectual property assets in the technology category. The process 1900 may also include receiving user input data indicating a selected entity of the one or more entities for comparing to the entity. The process 1900 may also include determining a portion of an intellectual property portfolio of the selected entity attributable to the technology category. The process 1900 may also include generating first data comparing the portion of the intellectual property portfolio of the selected entity to the intellectual property assets of the entity.

Additionally, or alternatively, the process 1900 may include generating a second quality score based at least in part on the portion of the intellectual property portfolio. In these examples, generating the first data may be based at least in part on the first quality score and the second quality score.

Additionally, or alternatively, the process 1900 may include generating a machine learning model configured to apply the parameters to determine the quality scores. The process 1900 may also include generating a training dataset that includes at least a portion of the feedback data. The process 1900 may also include training the machine learning model utilizing the training dataset such that a trained machine learning model is generated. In these examples, generating the first quality score for the intellectual property assets of the entity may be performed utilizing the trained machine learning model.

Additionally, or alternatively, the process 1900 may include receiving, after generating the first quality score, first data indicating due diligence results generated in association with the intellectual property assets of the entity. The process 1900 may also include modifying the updated parameters based at least in part on the first data such that modified parameters are generated. The process 1900 may also include generating a second quality score for the intellectual property assets of the entity utilizing the modified parameters.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:

one or more processors; and non-transitory computer-readable media storing instructions that, when executed by the one or more processors, cause the one or more processors to perform operations comprising:

receiving, via a secure user interface, a request to procure financing for an entity;

querying, based at least in part on receiving the request, a first dataset for first data representing intellectual property assets associated with the entity;

querying, based at least in part on receiving the request, a second dataset for second data representing business information associated with the entity;

querying a third dataset for third data representing completed transactions to procure financing for other entities, the third dataset indicating:

financing amounts for the completed transactions; and quality scores associated with the completed transactions;

generating a machine learning model configured to generate quality scores;

generating a training dataset that includes a transformed version of at least a portion of the third data, wherein the transformed version is configured to be utilized more readily by the machine learning model than the third data;

training the machine learning model utilizing the training dataset such that a trained machine learning model is generated, wherein the trained machine learning model comprises an improved version of the machine learning model with changed parameters from the machine learning model;

receiving feedback data indicating performance of the trained machine learning model;

retraining the trained machine learning model utilizing the feedback data such that a retrained machine learning model is generated, wherein the retrained machine learning model comprises a further improved version of the trained machine learning model with further changed parameters from the retrained machine learning model;

generating, utilizing the retrained machine learning model and based at least in part on the first data and the second data, a first quality score associated with the intellectual property assets, the first quality score indicating one or more of:

a degree of coverage associated with the intellectual property assets;

a degree of opportunity for expanding coverage of the intellectual property assets; and a degree of exposure associated with the intellectual property assets;

determining an upper-limit financing threshold based at least in part on the third data, the upper-limit financing threshold indicating upper-limit financing amounts across quality scores;

determining a lower-limit financing threshold based at least in part on the third data, the lower-limit financing threshold indicating lower-limit financing amounts across quality scores;

determining, utilizing the first quality score associated with the intellectual property assets and based at least in part on the upper-limit financing threshold, an upper-limit financing amount to associate with the intellectual property assets;

determining, utilizing the first quality score associated with the intellectual property assets and based at least in part on the lower-limit financing threshold, a lower-limit financing amount to associate with the intellectual property assets;

transmitting a command, via a network, to a client device, the command being configured to initiate an application and to display a user interface;

displaying, via the user interface in response to the command, at least one of the first quality score, the upper-limit financing threshold, lower-limit financing threshold, the upper-limit financing amount, or the lower-limit financing amount; and wherein the user interface is dynamically updated based at least in part on receiving new user input data.

2. The system of claim 1, the operations further comprising:

determining a first weighting parameter to apply to the degree of coverage, the degree of coverage indicating at least a quantity of the intellectual property assets, a breadth of the intellectual property assets, and a market alignment of the intellectual property assets to at least one market associated with the entity;

determining a second weighting parameter to apply to the degree of opportunity, the degree of opportunity indicating at least a number of intellectual property applications associated with the entity, a first intellectual property application filing velocity associated with the entity, and a second intellectual property application filing velocity associated with entities in the at least one market;

determining a third weighting parameter to apply to the degree of exposure, the degree of exposure indicating at least an intellectual property validity probability and litigation metrics associated with the intellectual property assets; and wherein the trained machine learning model is configured to determine quality scores utilizing the first weighting parameter, the second weighting parameter, and the third weighting parameter.

3. The system of claim 1, the operations further comprising:

establishing a scale of quality scores, the scale indicating a minimum possible quality score and a maximum possible quality score;

for individual ones of the completed transactions, associating the quality scores with the scale;

determining maximum financing amounts provided in the completed transactions for individual ones of the quality scores;

extrapolating the maximum financing amounts across various quality scores on the scale;

determining minimum financing amounts provided in the completed transactions for individual ones of the quality scores;

extrapolating the minimum financing amounts across the various quality scores on the scale; and wherein:

determining the upper-limit financing threshold is based at least in part on extrapolating the maximum financing amounts across the various quality scores on the scale; and determining the lower-limit financing threshold is based at least in part on extrapolating the minimum financing amounts across the various quality scores on the scale.

4. The system of claim 1, the operations further comprising:

determining an intellectual property portfolio size associated with individual ones of the completed transactions;

determining a variance from a given financing amount associated with the individual ones of the completed transactions based at least in part on the intellectual property portfolio size; and wherein:

determining the upper-limit financing threshold is based at least in part on the variance; and determining the lower-limit financing threshold is based at least in part on the variance.

5. A computer-implemented method, comprising:

receiving first data representing intellectual property assets associated with an entity;

receiving second data representing business information associated with the entity;

identifying third data representing completed transactions for other entities, the third data indicating:

financing amounts for the completed transactions; and quality scores associated with the completed transactions;

generating a machine learning model configured to generate quality scores;

generating a training dataset that includes a transformed version of at least a portion of the third data, wherein the transformed version is configured to be utilized more readily by the machine learning model than the third data;

training the machine learning model utilizing the training dataset such that a trained machine learning model is generated, wherein the trained machine learning model comprises an improved version of the machine learning model with changed parameters from the machine learning model;

receiving feedback data indicating performance of the trained machine learning model;

retraining the trained machine learning model utilizing the feedback data such that a retrained machine learning model is generated, wherein the retrained machine learning model comprises a further improved version of the trained machine learning model with further changed parameters from the retrained machine learning model;

generating, utilizing the retrained machine learning model and based at least in part on the first data and the second data, a first quality score associated with the intellectual property assets;

determining an upper-limit financing threshold based at least in part on the third data;

determining, utilizing the first quality score and based at least in part on the upper-limit financing threshold, a financing amount to associate with the intellectual property assets;

transmitting a command, via a network, to a client device, the command being configured to initiate an application and to display a user interface;

displaying, via the user interface in response to the command, at least one of the first quality score, the upper-limit financing threshold, or the financing amount; and wherein the user interface is dynamically updated based at least in part on receiving new user input data.

6. The computer-implemented method of claim 5, wherein the first quality score is based at least in part on a degree of coverage of the intellectual property assets, a degree of opportunity to expand coverage of the intellectual property assets, and a degree of exposure associated with the intellectual property assets, and the computer-implemented method further comprises:

determining a first weighting parameter to apply to the degree of coverage;

determining a second weighting parameter to apply to the degree of opportunity;

determining a third weighting parameter to apply to the degree of exposure, the first weighting parameter differing from the second weighting parameter and the third weighting parameter, the second weighting parameter differing from the third weighting parameter; and wherein the trained machine learning model is configured to determine quality scores utilizing the first weighting parameter, the second weighting parameter, and the third weighting parameter.

7. The computer-implemented method of claim 5, further comprising:

determining maximum financing amounts provided in the completed transactions;

extrapolating the maximum financing amounts across various quality scores on a scale;

determining minimum financing amounts provided in the completed transactions;

extrapolating the minimum financing amounts across the various quality scores on the scale; and wherein determining the upper-limit financing threshold is based at least in part on extrapolating the maximum financing amounts.

8. The computer-implemented method of claim 5, further comprising:

determining an intellectual property portfolio size associated with individual ones of the completed transactions;

determining a variance from a given financing amount associated with the individual ones of the completed transactions based at least in part on the intellectual property portfolio size; and wherein determining the upper-limit financing threshold is based at least in part on the variance.

9. The computer-implemented method of claim 5, further comprising:

receiving a request to procure financing for the entity, the request indicating a requested financing amount;

determining that the requested financing amount is greater than the upper-limit financing threshold; and generating a user interface configured to indicate:
    that the requested financing amount is greater than the upper-limit financing threshold; and
    a finance amount that satisfies the upper-limit financing threshold.

10. The computer-implemented method of claim 5, further comprising:
    determining a financing median based at least in part on the upper-limit financing threshold and a lower-limit financing threshold; and
    wherein determining the financing amount includes determining the financing amount from the financing median associated with the first quality score.

11. The computer-implemented method of claim 5, further comprising:
    parsing a first dataset for the first data utilizing an entity identifier associated with the entity;
    parsing a second dataset for the second data utilizing the entity identifier; and
    parsing a third dataset for the third data utilizing a requested financing amount specified by the entity.

12. The computer-implemented method of claim 5, further comprising:
    receiving further feedback data associated with the financing amount; and
    updating the retrained machine learning model utilizing the further feedback data.

13. A system, comprising:
one or more processors; and
non-transitory computer-readable media storing instructions that, when executed by the one or more processors, cause the one or more processors to perform operations comprising:
    receiving first data representing intellectual property assets associated with an entity;
    receiving second data representing business information associated with the entity;
    identifying third data representing completed transactions for other entities, the third data indicating:
        financing amounts for the completed transactions; and
        quality scores associated with the completed transactions;
    generating a machine learning model configured to generate quality scores;
    generating a training dataset that includes a transformed version of at least a portion of the third data, wherein the transformed version is configured to be utilized more readily by the machine learning model than the third data;
    training the machine learning model utilizing the training dataset such that a trained machine learning model is generated, wherein the trained machine learning model comprises an improved version of the machine learning model with changed parameters from the machine learning model;
    receiving feedback data indicating performance of the trained machine learning model;
    retraining the trained machine learning model utilizing the feedback data such that a retrained machine learning model is generated, wherein the retrained machine learning model comprises a further improved version of the trained machine learning model with further changed parameters from the retrained machine learning model;
    generating, utilizing the retrained machine learning model and based at least in part on the first data and the second data, a first quality score associated with the intellectual property assets;
    determining an upper-limit financing threshold based at least in part on the third data;
    determining, utilizing the first quality score and based at least in part on the upper-limit financing threshold, a financing amount to associate with the intellectual property assets;
    transmitting a command, via a network, to a client device, the command being configured to initiate an application and to display a user interface;
    displaying, via the user interface in response to the command, at least one of the first quality score, the upper-limit financing threshold, or the financing amount:
    wherein the user interface is dynamically updated based at least in part on receiving new user input data.

14. The system of claim 13, wherein the first quality score indicates a degree of coverage of the intellectual property assets, a degree of opportunity to expand coverage of the intellectual property assets, and a degree of exposure associated with the intellectual property assets, and the operations further comprise:
    determining a first weighting parameter to apply to the degree of coverage;
    determining a second weighting parameter to apply to the degree of opportunity;
    determining a third weighting parameter to apply to the degree of exposure, the first weighting parameter differing from the second weighting parameter and the third weighting parameter, the second weighting parameter differing from the third weighting parameter; and
    wherein the trained machine learning model is configured to determine quality scores utilizing the first weighting parameter, the second weighting parameter, and the third weighting parameter.

15. The system of claim 13, the operations further comprising:
    determining maximum financing amounts provided in the completed transactions;
    extrapolating the maximum financing amounts across various quality scores on a scale;
    determining minimum financing amounts provided in the completed transactions;
    extrapolating the minimum financing amounts across the various quality scores on the scale; and
    wherein determining the upper-limit financing threshold is based at least in part on extrapolating the maximum financing amounts.

16. The system of claim 13, the operations further comprising:
    determining an intellectual property portfolio size associated with individual ones of the completed transactions;
    determining a variance from a given financing amount associated with the individual ones of the completed transactions based at least in part on the intellectual property portfolio size; and
    wherein determining the upper-limit financing threshold is based at least in part on the variance.

17. The system of claim 13, the operations further comprising:

receiving a request to procure financing for the entity, the request indicating a requested financing amount;

determining that the requested financing amount is greater than the upper-limit financing threshold; and generating a user interface configured to indicate:

that the requested financing amount is greater than the upper-limit financing threshold; and a finance amount that satisfies the upper-limit financing threshold.

18. The system of claim 13, the operations further comprising:

determining a financing median based at least in part on the upper-limit financing threshold and a lower-limit financing threshold; and wherein determining the financing amount includes determining the financing amount from the financing median at the first quality score.

19. The system of claim 13, the operations further comprising:

parsing a first dataset for the first data utilizing an entity identifier associated with the entity;

parsing a second dataset for the second data utilizing the entity identifier; and parsing a third dataset for the third data utilizing a requested financing amount specified by the entity.

20. The system of claim 13, the operations further comprising:

receiving further feedback data associated with the financing amount; and updating the retrained machine learning model utilizing the further feedback data.

* * * * *